United States Patent
Wang et al.

(10) Patent No.: US 11,265,769 B2
(45) Date of Patent: Mar. 1, 2022

(54) HANDOVER METHOD, TERMINAL DEVICE, AND NETWORK DEVICE

(71) Applicant: HUAWEI TECHNOLOGIES CO., LTD., Guangdong (CN)

(72) Inventors: Man Wang, Shanghai (CN); Mingzeng Dai, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 0 days.

(21) Appl. No.: 16/673,497

(22) Filed: Nov. 4, 2019

(65) Prior Publication Data

US 2020/0068453 A1    Feb. 27, 2020

Related U.S. Application Data

(63) Continuation of application No. PCT/CN2018/085743, filed on May 5, 2018.

(30) Foreign Application Priority Data

May 5, 2017  (CN) .......................... 201710313955.6

(51) Int. Cl.
*H04W 36/00* (2009.01)
*H04W 76/27* (2018.01)
(Continued)

(52) U.S. Cl.
CPC ....... *H04W 36/0033* (2013.01); *H04W 36/08* (2013.01); *H04W 36/36* (2013.01);
(Continued)

(58) Field of Classification Search
CPC . H04W 36/0033; H04W 76/27; H04W 36/08; H04W 36/36; H04W 80/02;
(Continued)

(56) References Cited

U.S. PATENT DOCUMENTS

2008/0254800 A1* 10/2008 Chun ................ H04W 36/0033
                                                                 455/438
2011/0261683 A1   10/2011 Nitta et al.
(Continued)

FOREIGN PATENT DOCUMENTS

CN          1662091 A     8/2005
CN        101415211 A     4/2009
(Continued)

OTHER PUBLICATIONS

3GPP TS 38.300 V0.2.0 (May 2017), "3rd Generation Partnership Project; Technical Specification Group Radio Access Network; NG Radio Access Network; Overall Description; Stage 2 (Release 15)," May 2017, 33 pages.

(Continued)

*Primary Examiner* — Margaret G Mastrodonato
(74) *Attorney, Agent, or Firm* — Fish & Richardson P.C.

(57) ABSTRACT

The present disclosure relates to handover methods. In one example method, a first network node determines that a terminal device needs handover. The handover is from a second network node to a third network node. The first network node sends a user equipment context setup request message to the third network node. The user equipment context setup request message is used to instruct the third network node to establish a radio link for the terminal device. The first network node sends a handover command to the terminal device. The handover command is used to instruct the terminal device to perform the handover.

14 Claims, 12 Drawing Sheets

(51) Int. Cl.
   *H04W 36/08* (2009.01)
   *H04W 36/36* (2009.01)
   *H04W 80/02* (2009.01)
   *H04W 80/08* (2009.01)
(52) U.S. Cl.
   CPC ........... *H04W 76/27* (2018.02); *H04W 80/02* (2013.01); *H04W 80/08* (2013.01)
(58) Field of Classification Search
   CPC ............. H04W 80/08; H04W 36/0005; H04W 36/0055; H04W 24/10; H04W 36/00; H04W 74/006; H04W 74/004
   See application file for complete search history.

(56) References Cited

U.S. PATENT DOCUMENTS

| | | | | |
|---|---|---|---|---|
| 2014/0133446 | A1* | 5/2014 | Liu | H04W 88/12 370/329 |
| 2015/0079991 | A1* | 3/2015 | Koskinen | H04W 36/0083 455/436 |
| 2015/0189555 | A1 | 7/2015 | Ahluwalia | |

FOREIGN PATENT DOCUMENTS

| | | |
|---|---|---|
| CN | 101300753 B | 8/2011 |
| CN | 106162730 A | 11/2016 |
| EP | 2288194 A1 | 2/2011 |
| EP | 1940095 B1 | 5/2016 |
| EP | 3468251 A1 | 4/2019 |
| RU | 2551803 C1 | 5/2015 |
| WO | 2016090124 A1 | 6/2016 |

OTHER PUBLICATIONS

EPO Communication pursuant to Article 94(3) EPC dated Sep. 24, 2020, 7 pages.
ZTE, "Discussion on CU-DU interface user plane functions", 3GPP TSG RAN WG3 Meeting #95bis, R3-171020, Spokane, USA, Apr. 3-7, 2017, 2 pages.
LG Electronics Inc., "Fast re-transmission of lost RLC PDUs", 3GPP TSG-RAN WG3 Meeting #96, R3-171450, Hangzhou, China, May 15-19, 2017, 3 pages.
Samsung et al., "Intra-CU/Inter-DU Handover support," 3GPP TSG-RAN WG3 Meeting #96, R3-171697, Hangzhou, P.R.China, May 15-19, 2017, 2 pages.
ZTE, "Solution on PDCP PDU retransmission", 3GPP TSG RAN WG3 Meeting #96, R3-171661, Hangzhou,P.R.China, May 15-19, 2017, 4 pages.
CMCC, "Discussion on intra-NR mobility scenario in RRC Connected", 3GPP TSG-RAN WG3 Meeting #96, R3-171669, Hangzhou, China, May 15-19, 2017, 3 pages.
Huawei, "Analysis of the latency between CU and DU on common RRC procedures", 3GPP TSG-RAN3 Meeting#95bis, R3-171227, Spokane, USA, Apr. 3-7, 2017, 3 pages.
PCT International Search Report and Written Opinion in International Application No. PCT/CN2018/085,743, dated Jul. 16, 2018, 17 pages (With English Translation).
Altiostar Networks, "High-Layer Split Option," 3GPP TSG RAN WG3 Meeting #95, R3-170589, Athens, Greece, Feb. 13-17, 2017, 3 pages.
Office Action issued in Chinese Application No. 201710313955.6 dated Sep. 22, 2020, 13 pages.
3rd Generation Partnership Project; Technical Specification Group Radio Access Network;Study on New Radio Access Technology, Radio Access Architecture and Interfaces(Release 14), 3GPP Standard, Technical Report, 3GPP TR38.801, vol. RAN WG3, No. V1.2.0, XP051290383, Mar. 6, 2017, 90 pages.
Extended European Search Report issued in European Application No. 18794486.3 dated Jan. 17, 2020, 14 pages.
ZTE, "Discussion on CU-DU interface control plane functions," 3GPP TSG-RAN WG34#95bis, R3-171019, Spokane, USA, Apr. 3-7, 2017, 5 pages.
Catt, "Scenarios and principles for intra-gNB mobility," 3GPP TSG-RAN WG3#95bis, R3-170992,pokane, USA, Apr. 3-7, 2017, 5 pages.
Qualcomm Incorporated, "On the New RAN Architecture and the role of Xn," 3GPP TSG-RAN WG3#93bis, R3-162198,1Sophia Antipolis, France, Oct. 10-14, 2016, 8 pages.
Nokia, Alcatel-Lucent Shanghai Bell, KT, "F1 interface RAN3 stage 2—38.401," 3GPP TSG-RAN WG3#95bis, R3-171362, Spokane, USA, Apr. 3-7, 2017, 15 pages.
Office Action issued in Japanese Application No. 2019-560759 dated Jan. 19, 2021, 6 pages (with English translation).
Office Action issued in Chinese Application No. 201710313955.6 dated Apr. 8, 2021, 5 pages.
Catt, "L2 behaviors in NR handover or reconfiguration," 3GPP TSG RAN WG2 Meeting Ad Hoc, R2-1700221, Spokane, USA, Jan. 17-19, 2016, 4 pages.
Office Action issued in Korean Application No. 2019-7035995 dated Nov. 9, 2020, 6 pages (with English translation).
3GPP TR 38.801 V2.0.0 (Mar. 2017), "3rd Generation Partnership Project; Technical Specification Group Radio Access Network; Study on New Radio Access Technology; Radio Access Architecture and Interfaces(Release 14)," Mar. 2017, 90 pages.
Office Action issued in Indian Application No. 201937047134 dated May 28, 2021, 7 pages.
Intel Corporation, "Enhancements for option 2, to support inter-DU mobility," 3GPP TSG RAN WG3 Meeting #95bis, R3-171069, Spokane, USA, Apr. 3-7, 2017, 4 pages.
Huawei, "Discussion on Fast Retransmission and Path Switch between DUs for option 2 and option 3-1," 3GPP TSG-RAN3 Meeting #95bis, R3-171230, Spokane, USA, Apr. 3-7, 2017, 3 pages.
Office Action issued in Russian Application No. 2019139385/ 07(077440) dated Jun. 29, 2021, 28 pages (with English translation).

* cited by examiner

HANDOVER METHOD, TERMINAL DEVICE, AND NETWORK DEVICE

CROSS-REFERENCE TO RELATED APPLICATIONS

This application is a continuation of International Application No. PCT/CN2018/085743, filed on May 5, 2018, which claims priority to Chinese Patent Application No. 201710313955.6, filed on May 5, 2017, The disclosures of the aforementioned applications are hereby incorporated by reference in their entireties.

TECHNICAL FIELD

This application relates to the communications field, and more specifically, to a handover method, a terminal device, and a network device.

BACKGROUND

In a cloud radio access network (CRAN) architecture, split between a CRAN control node (Central Unit or Control Unit, CU) and a data unit (Data Unit or Distributed Unit, DU) is introduced. To be specific, an integrally deployed baseband processing unit (BBU) is divided into two parts. Different from an original base station architecture, the CU-DU split introduces a CU-DU interface, and information originally exchanged inside a base station needs to be transferred through the CU-DU interface.

Some important wireless communication processes such as a handover (Handover, HO) procedure including intra-CU handover, intra-DU handover, and inter-CU handover were all processed by an entire base station. However, because a base station architecture is changed now, specific processes and processing modules need to be redesigned, and coordination between the two split modules is further required.

In a CU-DU split architecture, an HO procedure includes an intra-CU handover procedure, an intra-DU handover procedure, and an inter-CU handover procedure. HO solutions need to be redesigned and design solutions need to be optimized to implement these procedures.

The problem of terminal device handover when some functions in a network device are distributed to different network nodes cannot be resolved in the prior art.

SUMMARY

This application provides a handover method, a terminal device, and a network device, so that normal handover of a terminal device can be ensured when some functions in a network device are distributed to different network nodes.

According to a first aspect, a handover method is provided, including: learning, by a first network node, that a terminal device needs handover, where the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; when the handover is from the second network node to the third network node, sending, by the first network node, radio link establishment instruction information to the third network node, where the radio link establishment instruction information is used to instruct the third network node to establish a radio link for the terminal device; when the handover is from the first cell of the second network node to the second cell of the second network node, sending, by the first network node, radio link change instruction information to the second network node, where the radio link change instruction information is used to instruct to switch a serving cell of the terminal device from the first cell to the second cell; and sending, by the first network node, a handover command to the terminal device, where the handover command is used to instruct the terminal device to perform the handover.

With reference to the first aspect, in a first possible implementation of the first aspect, the second network node and the third network node are managed by the first network node.

With reference to the first possible implementation of the first aspect, in a second possible implementation of the first aspect, when the handover is from the second network node to the third network node, the method further includes: receiving, by the first network node, a data sending status sent by the second network node, where the data sending status is used to indicate a sequence number of data that is unsuccessfully sent to the terminal device; and sending, by the first network node, the unsuccessfully sent data to the third network node based on the data sending status.

In some possible implementations, the first network node determines a data sending status of the terminal device based on data sent by the second network node, where the data sending status is used to indicate a sequence number of unsuccessfully sent data; and the first network node sends the sequence number of the unsuccessfully sent data to the terminal device, so that the terminal device continues to send the unsuccessfully sent data to the first network node after being handed over to the third network node.

With reference to the second possible implementation of the first aspect, in a third possible implementation of the first aspect, before the sending, by the first network node, a handover command to the terminal device, the method further includes: sending, by the first network node, a first handover request message to the third network node; and receiving, by the first network node, a first handover request acknowledgment message sent by the third network node.

With reference to the second or third possible implementation of the first aspect, in a fourth possible implementation of the first aspect, after the sending, by the first network node, a handover command to the terminal device, the method further includes: receiving, by the first network node, a random access request sent by the terminal device; sending, by the first network node, a random access response to the terminal device; receiving, by the first network node, a radio resource control setup complete message sent by the terminal device; and sending, by the first network node, instruction information to the second network node, where the instruction information is used to instruct the second network node to release context information of the terminal device.

With reference to the first aspect, in a fifth possible implementation of the first aspect, the second network node is managed by the first network node, the third network node is managed by a fourth network node, and the fourth network node includes a Packet Data Convergence Protocol layer function and a radio resource control function.

With reference to the fifth possible implementation of the first aspect, in a sixth possible implementation of the first aspect, when the handover is from the second network node to the third network node, the method further includes: receiving, by the first network node, a data sending status sent by the second network node, where the data sending status is used to indicate data that is unsuccessfully sent to the terminal device; and sending, the first network node, the data sending status to the fourth network node, so that the fourth network node sends the unsuccessfully sent data to the third network node, where the data sending status is used to indicate the sequence number of the data that is unsuccessfully sent to the terminal device.

With reference to the fifth or sixth possible implementation of the first aspect, in a seventh possible implementation of the first aspect, before the sending, by the first network node, a handover command to the terminal device, the method further includes: sending, by the first network node, a second handover request message to the fourth network node; and receiving, by the first network node, a second handover request acknowledgment message sent by the fourth network node.

With reference to the sixth or seventh possible implementation of the first aspect, in an eighth possible implementation of the first aspect, after the sending, by the first network node, a handover command to the terminal device, the method further includes: sending, by the first network node, instruction information to the second network node, where the instruction information is used to instruct the second network node to release context information of the terminal device.

According to the handover method in this embodiment of this application, normal handover of a terminal device can be ensured when some functions in a network device are distributed to different network nodes.

According to a second aspect, a network device is provided, including a memory and a processor. The memory is configured to store an instruction, and the processor is configured to invoke the instruction in the memory, to perform operations in the method in the first aspect or any implementation of the first aspect.

According to a third aspect, a handover method is provided, including: sending, by a terminal device, a first message to a first network node, where the first message is used to request the first network node to perform handover of the terminal device, the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; and receiving, by the terminal device, a handover command sent by the first network node, where the handover command is used to instruct to perform the handover.

With reference to the third aspect, in a first possible implementation of the third aspect, the second network node and the third network node are managed by the first network node.

In some possible implementations, when the handover is from the second network node to the third network node, the terminal device receives a sequence number that is sent by the first network node and that is of unsuccessfully sent data, so that the terminal device continues to send the unsuccessfully sent data to the first network node after being handed over to the third network node.

With reference to the first possible implementation of the third aspect, in a second possible implementation of the third aspect, when the handover is from the second network node to the third network node, before the receiving, by the terminal device, a handover command sent by the first network node, the method further includes: establishing, by the terminal device, a first link and a second link, where the first link is from the first network node to the second network node, and the second link is from the first network node to the third network node; and if a radio link failure occurs on the first link, determining, by the terminal device, to hand over from the first link to the second link; and transmitting, by the terminal device, data on the second link.

With reference to the second possible implementation of the third aspect, in a third possible implementation of the third aspect, before the terminal device hands over from the first link to the second link, the method further includes: measuring and/or monitoring, by the terminal device, the second link based on a first period.

With reference to the first possible implementation of the third aspect, in a fourth possible implementation of the third aspect, when the handover is from the second network node to the third network node, before the receiving, by the terminal device, a handover command sent by the first network node, the method further includes: establishing, by the terminal device, a first link, where the first link is a link from the first network node to the second network node; if a radio link failure occurs on the first link, continuing, by the terminal device, to measure and/or monitor the first link; and when the first link recovers, transmitting, by the terminal device, data on the first link.

With reference to any one of the second to fourth possible implementations of the third aspect, in a fifth possible implementation of the third aspect, after the receiving, by the terminal device, a handover command sent by the first network node, the method further includes: sending, by the terminal device, a random access request to the first network node and the third network node; receiving, by the terminal device, random access responses sent by the first network node and the third network node; and sending, by the terminal device, a radio resource control setup complete message to the first network node and the third network node.

With reference to the third aspect, in a sixth possible implementation of the third aspect, the second network node is managed by the first network node, the third network node is managed by a fourth network node, and the fourth network node includes at least one of a Packet Data Convergence Protocol layer function, a Service Data Adaptation Protocol layer function, and a radio resource control function.

With reference to the sixth possible implementation of the third aspect, in a seventh possible implementation of the third aspect, when the handover is from the second network node to the third network node, the method further includes: sending, by the terminal device, a random access request to the third network node and the fourth network node; receiving, by the terminal device, random access responses sent by the third network node and the fourth network node; and sending, by the terminal device, a radio resource control setup complete message to the third network node and the fourth network node.

According to the handover method in this embodiment of this application, normal handover of a terminal device can be ensured when some functions in a network device are distributed to different network nodes.

According to a fourth aspect, a terminal device is provided, including a memory and a processor. The memory is configured to store an instruction, and the processor is configured to invoke the instruction in the memory, to perform operations in the method in the third aspect or any implementation of the third aspect.

According to a fifth aspect, a handover method is provided, including: receiving, by a second network node, a handover command sent by a first network node, where the handover command is used to instruct to perform handover of a terminal device, the handover is from the second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; when the handover is from the first cell of the second network node to the second cell of the second network node, receiving, by the second network node, radio link change instruction information sent by the first network node, where the radio link change instruction information is used to instruct to switch a serving cell of the terminal device from the first cell to the second cell; and releasing, by the second network node, context information of the terminal device based on the handover command.

With reference to the fifth aspect, in a first possible implementation of the fifth aspect, the second network node and the third network node are managed by the first network node.

With reference to the fifth aspect, in a second possible implementation of the fifth aspect, the second network node is managed by the first network node, the third network node is managed by a fourth network node, and the fourth network node includes a Packet Data Convergence Protocol layer function and a radio resource control function.

With reference to the first or second possible implementation of the fifth aspect, in a third possible implementation of the fifth aspect, when the handover is from the second network node to the third network node, and the method further includes: sending, by the second network node, a data sending status to the first network node, where the data sending status is used to indicate a sequence number of data that is unsuccessfully sent to the terminal device.

According to the handover method in this embodiment of this application, normal handover of a terminal device can be ensured when some functions in a network device are distributed to different network nodes.

According to a sixth aspect, a network device is provided, including a memory and a processor. The memory is configured to store an instruction, and the processor is configured to invoke the instruction in the memory, to perform operations in the method in the fifth aspect or any implementation of the fifth aspect.

According to a seventh aspect, a handover method is provided, including: receiving, by a third network node, a first handover request message sent by a first network node, where the first handover request message is used to instruct to perform handover of a terminal device, the handover is from a second network node to the third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; when the handover is from the second network node to the third network node, receiving, by the third network node, radio link establishment instruction information sent by the first network node, where the radio link establishment instruction information is used to instruct the third network node to establish a radio link for the terminal device; and sending, by the third network node, a first handover request acknowledgment message to the first network node, where the first handover request acknowledgment message is used to acknowledge the handover of the terminal device.

With reference to the seventh aspect, in a first possible implementation of the seventh aspect, the second network node and the third network node are managed by the first network node.

With reference to the seventh aspect, in a second possible implementation of the seventh aspect, the second network node is managed by the first network node, the third network node is managed by a fourth network node, and the fourth network node includes a Packet Data Convergence Protocol layer function and a radio resource control function.

With reference to the first or second possible implementation of the seventh aspect, in a third possible implementation of the seventh aspect, when the handover is from the second network node to the third network node, the method further includes: receiving, by the third network node, data segmentation information sent by the second network node, where the data segmentation information is used to indicate a data segment that is unsuccessfully sent to the terminal device.

According to the handover method in this embodiment of this application, normal handover of a terminal device can be ensured when some functions in a network device are distributed to different network nodes.

According to an eighth aspect, a network device is provided, including a memory and a processor. The memory is configured to store an instruction, and the processor is configured to invoke the instruction in the memory, to perform operations in the method in the seventh aspect or any implementation of the seventh aspect.

According to a ninth aspect, a handover method is provided, including: receiving, by a fourth network node, a second handover request message sent by a first network node, where the second handover request message is used to instruct to perform handover of a terminal device, the handover is from a second network node to a third network node, the second network node is managed by the first network node, the third network node is managed by the fourth network node, the first network node and the fourth network node each include at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; when the handover is from the second network node to the third network node, receiving, by the fourth network node, a data sending status sent by the first network node, where the data sending status is used to indicate a sequence number of data that is unsuccessfully sent to the terminal device; and sending, by the fourth network node, a second handover request acknowledgment message to the first network node, where the second handover request acknowledgment message is used to acknowledge the handover of the terminal device.

With reference to the ninth aspect, in a first possible implementation of the ninth aspect, the method further includes: sending, by the fourth network node, the unsuccessfully sent data to the third network node based on the data sending status.

With reference to the ninth aspect or the first possible implementation of the ninth aspect, in a second possible implementation of the ninth aspect, the method further includes: receiving, by the fourth network node, a random access request sent by the terminal device; sending, by the fourth network node, a random access response to the terminal device; receiving, by the fourth network node, a radio resource control setup complete message sent by the terminal device; and sending, by the fourth network node, instruction information to the first network node, where the instruction information is used to instruct the second network node to release context information of the terminal device.

With reference to the ninth aspect or the first or second possible implementation of the ninth aspect, in a third possible implementation of the ninth aspect, the method further includes: sending, by the fourth network node, a third handover request message to a core network; and receiving, by the fourth network node, a third handover request acknowledgment message sent by the core network.

According to the handover method in this embodiment of this application, normal handover of a terminal device can be ensured when some functions in a network device are distributed to different network nodes.

According to a tenth aspect, a network device is provided, including a memory and a processor. The memory is configured to store an instruction, and the processor is configured to invoke the instruction in the memory, to perform operations in the method in the ninth aspect or any implementation of the ninth aspect.

According to an eleventh aspect, a network device is provided, including: a processing module, configured to learn that a terminal device needs handover, where the handover is from a second network node to a third network node, or the handover is from a first cell of the second network node to a second cell of the second network node, a first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; and a transceiver module, configured to: when the handover is from the second network node to the third network node, send radio link establishment instruction information to the third network node, where the radio link establishment instruction information is used to instruct the third network node to establish a radio link for the terminal device, where the transceiver module is further configured to: when the handover is from the first cell of the second network node to the second cell of the second network node, send radio link change instruction information to the second network node, where the radio link change instruction information is used to instruct to switch a serving cell of the terminal device from the first cell to the second cell; and the transceiver module is further configured to send a handover command to the terminal device, where the handover command is used to instruct the terminal device to perform the handover.

With reference to the eleventh aspect, in a first possible implementation of the eleventh aspect, the second network node and the third network node are managed by the first network node.

With reference to the first possible implementation of the eleventh aspect, in a second possible implementation of the eleventh aspect, when the handover is from the second network node to the third network node, the transceiver module is further configured to receive a data sending status sent by the second network node, where the data sending status is used to indicate a sequence number of data that is unsuccessfully sent to the terminal device; and the processing module is further configured to send the unsuccessfully sent data to the third network node based on the data sending status.

With reference to the second possible implementation of the eleventh aspect, in a third possible implementation of the eleventh aspect, the transceiver module is further configured to send a first handover request message to the third network node; and the transceiver module is further configured to receive a first handover request acknowledgment message sent by the third network node.

With reference to the second or third possible implementation of the eleventh aspect, in fourth possible implementation of the eleventh aspect, the transceiver module is further configured to receive a random access request sent by the terminal device; the transceiver module is further configured to send a random access response to the terminal device; the transceiver module is further configured to receive a radio resource control setup complete message sent by the terminal device; and the transceiver module is further configured to send instruction information to the second network node, where the instruction information is used to instruct the second network node to release context information of the terminal device.

With reference to the eleventh aspect, in a fifth possible implementation of the eleventh aspect, the second network node is managed by the first network node, the third network node is managed by a fourth network node, and the fourth network node includes a Packet Data Convergence Protocol layer function and a radio resource control function.

With reference to the fifth possible implementation of the eleventh aspect, in a sixth possible implementation of the eleventh aspect, the transceiver module is further configured to receive a data sending status sent by the second network node, where the data sending status is used to indicate data that is unsuccessfully sent to the terminal device; and the transceiver module is further configured to send the data sending status to the fourth network node, so that the fourth network node sends the unsuccessfully sent data to the third network node.

With reference to the fifth or sixth possible implementation of the eleventh aspect, in a seventh possible implementation of the eleventh aspect, the transceiver module is further configured to send a second handover request message to the fourth network node; and the transceiver module is further configured to receive a second handover request acknowledgment message sent by the fourth network node.

With reference to the sixth or seventh possible implementation of the eleventh aspect, in an eighth possible implementation of the eleventh aspect, the transceiver module is further configured to send instruction information to the second network node, where the instruction information is used to instruct the second network node to release context information of the terminal device.

According to the network device in this embodiment of this application, normal handover of a terminal device can be ensured when some functions in a network device are distributed to different network nodes.

According to a twelfth aspect, a terminal device is provided, including: a transceiver module, configured to send a first message to a first network node, where the first message is used to request the first network node to perform handover of the terminal device, the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function, where the transceiver module is further configured to receive a handover command sent by the first network node, where the handover command is used to instruct to perform the handover.

With reference to the twelfth aspect, in a first possible implementation of the twelfth aspect, the second network node and the third network node are managed by the first network node.

In some possible implementations, when the handover is from the second network node to the third network node, the transceiver module is further configured to receive a sequence number that is sent by the first network node and that is of unsuccessfully sent data, so that the terminal device continues to send the unsuccessfully sent data to the first network node after being handed over to the third network node.

With reference to the first possible implementation of the twelfth aspect, in a second possible implementation of the twelfth aspect, when the handover is from the second network node to the third network node, the terminal device further includes: a processing module, configured to establish a first link and a second link, where the first link is a link from the first network node to the second network node, and the second link is a link from the first network node to the third network node, where if a radio link failure occurs on the first link, the processing module is further configured to determine to hand over from the first link to the second link; and the transceiver module is further configured to transmit data on the second link.

With reference to the second possible implementation of the twelfth aspect, in a third possible implementation of the twelfth aspect, the processing module is further configured to measure and/or monitor the second link based on a first period.

With reference to the first possible implementation of the twelfth aspect, in a fourth possible implementation of the twelfth aspect, when the handover is from the second network node to the third network node, the processing module is further configured to establish a first link, where the first link is a link from the first network node to the second network node; if a radio link failure occurs on the first link, the processing module is further configured to continue to measure and/or monitor the first link; and when the first link recovers, the transceiver module is further configured to transmit data on the first link.

With reference to any one of the second to fourth possible implementations of the twelfth aspect, in a fifth possible implementation of the twelfth aspect, the transceiver module is further configured to send a random access request to the first network node and the third network node; the transceiver module is further configured to receive random access responses sent by the first network node and the third network node; and the transceiver module is further configured to send a radio resource control setup complete message to the first network node and the third network node.

With reference to the twelfth aspect, in a sixth possible implementation of the twelfth aspect, the second network node is managed by the first network node, the third network node is managed by a fourth network node, and the fourth network node includes at least one of a Packet Data Convergence Protocol layer function, a Service Data Adaptation Protocol layer function, and a radio resource control function.

With reference to the sixth possible implementation of the twelfth aspect, in a seventh possible implementation of the twelfth aspect, when the handover is from the second network node to the third network node, the transceiver module is further configured to send a random access request to the third network node and the fourth network node; the transceiver module is further configured to receive random access responses sent by the third network node and the fourth network node; and the transceiver module is further configured to send a radio resource control setup complete message to the third network node and the fourth network node.

According to the network device in this embodiment of this application, normal handover of a terminal device can be ensured when some functions in a network device are distributed to different network nodes.

According to a thirteenth aspect, a network device is provided, including: a transceiver module, configured to receive a handover command sent by a first network node, where the handover command is used to instruct to perform handover of a terminal device, the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function, where when the handover is from the first cell of the second network node to the second cell of the second network node, the transceiver module is further configured to receive radio link change instruction information sent by the first network node, where the radio link change instruction information is used to instruct to switch a serving cell of the terminal device from the first cell to the second cell; and a processing module, configured to release context information of the terminal device based on the handover command.

With reference to the thirteenth aspect, in a first possible implementation of the thirteenth aspect, the second network node and the third network node are managed by the first network node.

With reference to the thirteenth aspect, in a second possible implementation of the thirteenth aspect, the second network node is managed by the first network node, the third network node is managed by a fourth network node, and the fourth network node includes a Packet Data Convergence Protocol layer function and a radio resource control function.

With reference to the first or second possible implementation of the thirteenth aspect, in a third possible implementation of the thirteenth aspect, when the handover is from the second network node to the third network node, the transceiver module is further configured to send a data sending status to the first network node, where the data sending status is used to indicate a sequence number of data that is unsuccessfully sent to the terminal device.

According to the network device in this embodiment of this application, normal handover of a terminal device can be ensured when some functions in a network device are distributed to different network nodes.

According to a fourteenth aspect, a network device is provided, including: a transceiver module, configured to receive a first handover request message sent by a first network node, where the first handover request message is used to instruct to perform handover of a terminal device, the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function, where when the handover is from the second network node to the third network node, the transceiver module is further configured to receive radio link establishment instruction information sent by the first network node, where the radio link establishment instruction information is used to instruct the third network node to establish a radio link for the terminal device; and a processing module, configured to control the transceiver module to send a first handover request acknowledgment message to the first network node, where the first handover request acknowledgment message is used to acknowledge the handover of the terminal device.

With reference to the fourteenth aspect, in a first possible implementation of the fourteenth aspect, the second network node and the third network node are managed by the first network node.

With reference to the fourteenth aspect, in a second possible implementation of the fourteenth aspect, the second network node is managed by the first network node, the third network node is managed by a fourth network node, and the fourth network node includes a Packet Data Convergence Protocol layer function and a radio resource control function.

With reference to the first or second possible implementation of the fourteenth aspect, in a third possible implementation of the fourteenth aspect, when the handover is from the second network node to the third network node, the transceiver module is further configured to receive data segmentation information sent by the second network node, where the data segmentation information is used to indicate a data segment that is unsuccessfully sent to the terminal device.

According to the network device in this embodiment of this application, normal handover of a terminal device can be ensured when some functions in a network device are distributed to different network nodes.

According to a fifteenth aspect, a network device is provided, including: a transceiver module, configured to receive a second handover request message sent by a first network node, where the second handover request message is used to instruct to perform handover of a terminal device, the handover is from a second network node to a third network node, the second network node is managed by the first network node, the third network node is managed by a fourth network node, the first network node and the fourth network node each include at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function, where when the handover is from the second network node to the third network node, the transceiver module is further configured to receive a data sending status sent by the first network node, where the data sending status is used to indicate a sequence number of data that is unsuccessfully sent to the terminal device; and a processing module, configured to control the transceiver module to send a second handover request acknowledgment message to the first network node, where the second handover request acknowledgment message is used to acknowledge the handover of the terminal device.

With reference to the fifteenth aspect, in a first possible implementation of the fifteenth aspect, the transceiver module is further configured to send, under the control of the processing module, the unsuccessfully sent data to the third network node based on the data sending status.

With reference to the first possible implementation of the fifteenth aspect or the ninth aspect, in a second possible implementation of the fifteenth aspect, the transceiver module is further configured to receive a random access request sent by the terminal device; the transceiver module is further configured to send a random access response to the terminal device; the transceiver module is further configured to receive a radio resource control setup complete message sent by the terminal device; and the transceiver module is further configured to send instruction information to the first network node, where the instruction information is used to instruct the second network node to release context information of the terminal device.

With reference to the fifteenth aspect or the first or second possible implementation of the fifteenth aspect, in a third possible implementation of the fifteenth aspect, the transceiver module is further configured to send a third handover request message to a core network; and the transceiver module is further configured to receive a third handover request acknowledgment message sent by the core network.

According to the network device in this embodiment of this application, normal handover of a terminal device can be ensured when some functions in a network device are distributed to different network nodes.

According to a sixteenth aspect, a computer readable storage medium is provided, storing an instruction enabling, when the instruction runs on a computer, the computer to perform the methods in the foregoing aspects.

According to a seventeenth aspect, a system chip is provided, including an input/output interface, at least one processor, at least one memory, and a bus, where the at least one memory is configured to store an instruction, and the at least one processor is configured to invoke the instruction in the at least one memory, to perform operations in the methods in the foregoing aspects.

DESCRIPTION OF EMBODIMENTS

The following describes technical solutions of this application with reference to the accompanying drawings.

Figure 1:
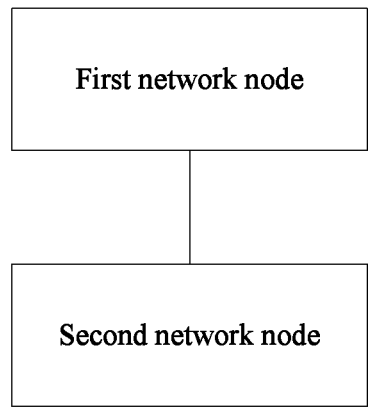
FIG. 1 is a schematic diagram of an application scenario of a technical solution according to an embodiment of this application.

Embodiments of this application are applicable to various forms of systems in which some functions in a network device are distributed. FIG. 1 is a schematic diagram of an application scenario of a technical solution according to an embodiment of this application. As shown in FIG. 1, some functions in the network device are distributed to a first network node and a second network node.

Figure 2:
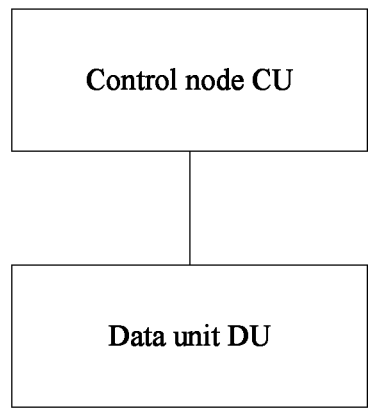
FIG. 2 is a schematic diagram of another application scenario of a technical solution according to an embodiment of this application.

Specifically, FIG. 2 is a schematic diagram of another application scenario of a technical solution according to an embodiment of this application. As shown in FIG. 2, CU-DU split is introduced to a CRAN architecture. A CU may correspond to the first network node in FIG. 1, and a DU may correspond to the second network node in FIG. 1.

It should be understood that the first network node and the second network node may be two physically or logically separated modules in a complete network architecture, or may be two completely independent logical network elements.

It should be further understood that the embodiments of this application are applicable to various handover procedures in a CU-DU architecture. The handover procedures include, but are not limited to, intra-CU handover, intra-DU handover, and inter-CU handover.

Figure 3:
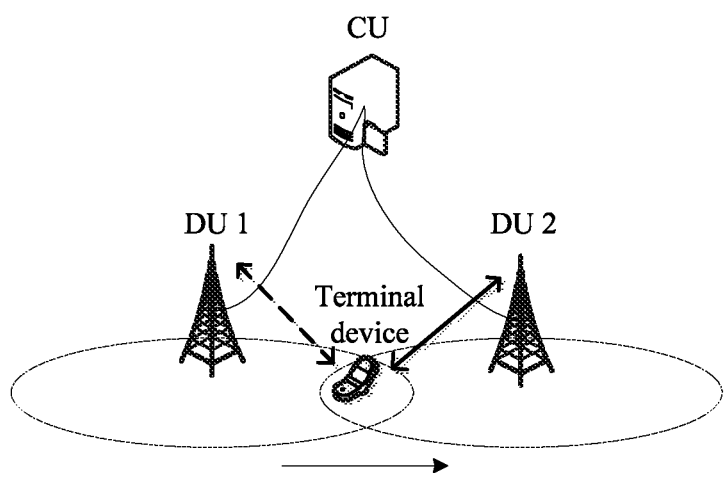
FIG. 3 is a schematic diagram of still another application scenario of a technical solution according to an embodiment of this application.

FIG. 3 is a schematic diagram of still another application scenario of a technical solution according to an embodiment of this application. The application scenario mainly includes intra-CU handover.

Figure 4:
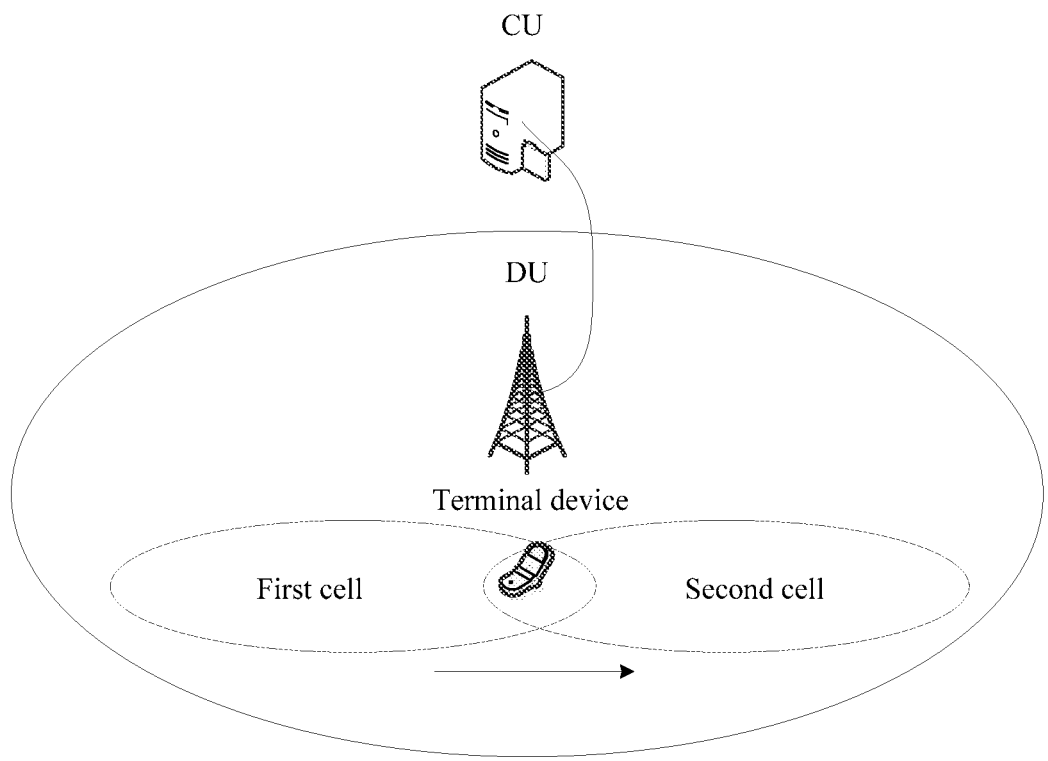
FIG. 4 is a schematic diagram of still another application scenario of a technical solution according to an embodiment of this application.

FIG. 4 is a schematic diagram of still another application scenario of a technical solution according to an embodiment of this application. The application scenario mainly includes intra-DU handover.

Figure 5:
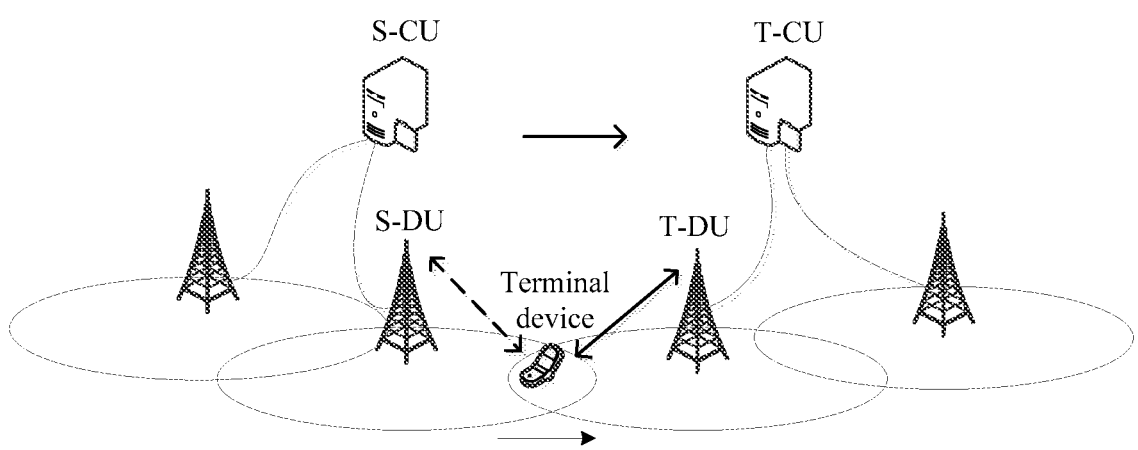
FIG. 5 is a schematic diagram of still another application scenario of a technical solution according to an embodiment of this application.

FIG. 5 is a schematic diagram of still another application scenario of a technical solution according to an embodiment of this application. The application scenario mainly includes inter-CU handover.

A CU has radio resource control (RRC) functions or some RRC control functions, including all or some protocol layer functions of an existing base station. For example, only RRC functions or some RRC functions are included, or RRC functions or Service Data Adaptation Protocol (SDAP) layer functions are included, or RRC functions/Packet Data Convergence Protocol (PDCP) layer functions are included, or RRC functions/PDCP layer functions and some Radio Link Control (RLC) layer functions are included; or RRC functions/PDCP layer functions/Media Access Control (MAC) layer functions, and even some or all physical layer PHY functions are included. Any other possibility is not excluded.

A DU has all or some protocol layer functions of an existing base station, to be specific, some protocol layer function units of RRC/SDAP/PDCP/RLC/MAC/PHY. For example, protocol layer functions of PDCP/RLC/MAC/PHY are included, or protocol layer functions of RLC/MAC/PHY are included or some RLC/MAC/PHY functions are included, or only all or some PHY functions are included. It should be noted here that changes may be made to the protocol layer functions discussed here, and the changes all fall within the protection scope of this application.

It should be understood that the technical solutions in the embodiments of this application may be applied to various communications systems such as a Global System for Mobile Communications (GSM) system, a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, a Universal Mobile Telecommunications System (UMTS) system, a future fifth-generation ($5^{th}$-Generation, 5G) communications system, and a CRAN system.

It should be further understood that the network device in this embodiment of this application may be a device configured to communicate with a terminal device, for example, may be a combination of a base transceiver station (BTS) and a base station controller (BSC) in a GSM system or a CDMA system, or may be a Node B (NB) or a radio network controller (RNC) in a WCDMA system, or may be an evolved Node B (Evolved Node B, eNB or eNodeB) in an LTE system. Alternatively, the network device may be a relay station, an access point, an in-vehicle device, a wearable device, an access network device in a future 5G network, for example, a next-generation base station, or an access network device in a future evolved public land mobile network (PLMN), or the like.

Specifically, a UMTS system in the third-generation (3rd-Generation, 3G) mobile communications technology includes a scenario in which a radio network control node and a base station are separated. An LTE system includes a scenario in which a baseband module and a radio frequency module are separated, namely, a remote radio frequency scenario, a data center (DC) scenario in which two different networks need to be interconnected, a macro-micro base station scenario in which a macro base station and a micro base station are connected to each other through an interface, and an LTE-WiFi aggregation (LWA) scenario. A 5G system includes various non-cell scenarios (a terminal can be freely handed over between cells, and no clear boundary exists between the cells) in which a control node is connected to all cells, or a cell is connected to various transmission nodes, a CRAN scenario in which a BBU is divided, and a CRAN virtualization scenario in which some functions of a BBU are deployed together and virtualized, and some other functions are deployed separately and may be physically separated from the functions deployed together. It should be understood that scenarios in which different systems/standards coexist all fall within the application scope of this application.

The embodiments are described in combination with a terminal device in this application. The terminal device may be user equipment (UE), an access terminal, a user unit, a user station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network, a terminal device in a PLMN, or the like.

Figure 6:
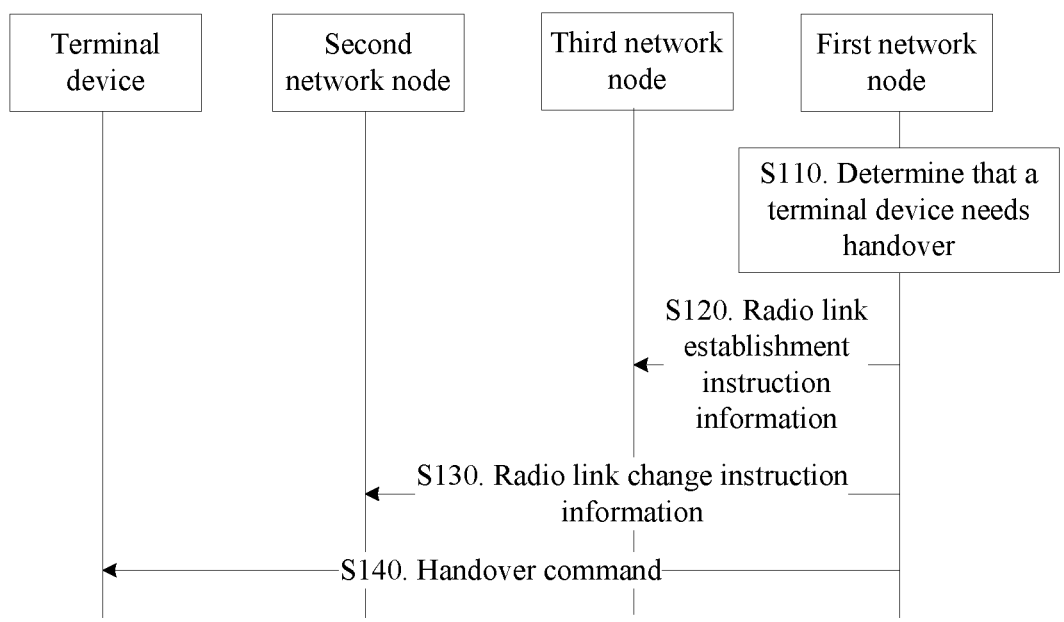
FIG. 6 is a schematic flowchart of a handover method according to an embodiment of this application.

FIG. 6 is a schematic flowchart of a handover method 100 according to an embodiment of this application. A first network node may correspond to a CU in FIG. 3, a second network node may correspond to a DU 1 in FIG. 3, and a third network node may correspond to a DU 2 in FIG. 3. Alternatively, the first network node may correspond to a CU in FIG. 4, and the second network node may correspond to a DU in FIG. 4. Alternatively, the first network node may correspond to a source control node (S-CU) in FIG. 5, the second network node may correspond to a source data unit (S-DU) in FIG. 5, and the third network node may correspond to a target data unit (T-DU) in FIG. 5. As shown in FIG. 6, the method 100 includes the following steps:

S110: The first network node determines that a terminal device needs handover, where the handover is from the second network node to the third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function.

S120: When the handover is from the second network node to the third network node, the first network node sends radio link establishment instruction information to the third network node, where the radio link establishment instruction information is used to instruct the third network node to establish a radio link for the terminal device.

S130: When the handover is from the first cell of the second network node to the second cell of the second network node, the first network node sends radio link change instruction information to the second network node, where the radio link change instruction information is used to instruct to switch a serving cell of the terminal device from the first cell to the second cell.

S140: The first network node sends a handover command to the terminal device, where the handover command is used to instruct the terminal device to perform the handover.

Specifically, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function. After the first network node determines that the terminal device needs handover, the first network node sends a handover command to the terminal device, where the handover command is used to instruct the terminal device to hand over from the second network node to the third network node, or hand over from the first cell of the second network node to the second cell of the second network node.

For example, as shown in FIG. 3, the CU has PDCP and RRC functions, the DU 1 and the DU 2 have an RLC/MAC/PHY function, and the DU 1 and the DU 2 are managed by the CU. After receiving a first message from the terminal device, the CU determines that the terminal device needs to be handed over from the DU 1 controlled by the CU to the DU 2 controlled by the CU.

For another example, as shown in FIG. 4, the CU has PDCP and RRC functions, and the DU has an RLC/MAC/PHY function. After receiving a first message from the terminal device, the CU determines that the terminal device needs to be handed over from a first cell controlled by the DU to a second cell controlled by the DU.

For still another example, as shown in FIG. 5, the S-CU and a T-CU have PDCP and RRC functions, the S-DU and the T-DU have an RLC/MAC/PHY function, the S-DU is managed by the S-CU, and the T-DU is managed by the T-CU. After receiving a first message from the terminal device, the CU determines that the terminal device needs to be handed over from the S-DU controlled by the S-CU to the T-DU controlled by the T-CU.

According to the handover method in this embodiment of this application, fast handover of a terminal device can be ensured when some functions in a network device are distributed to different network nodes.

Figure 7:
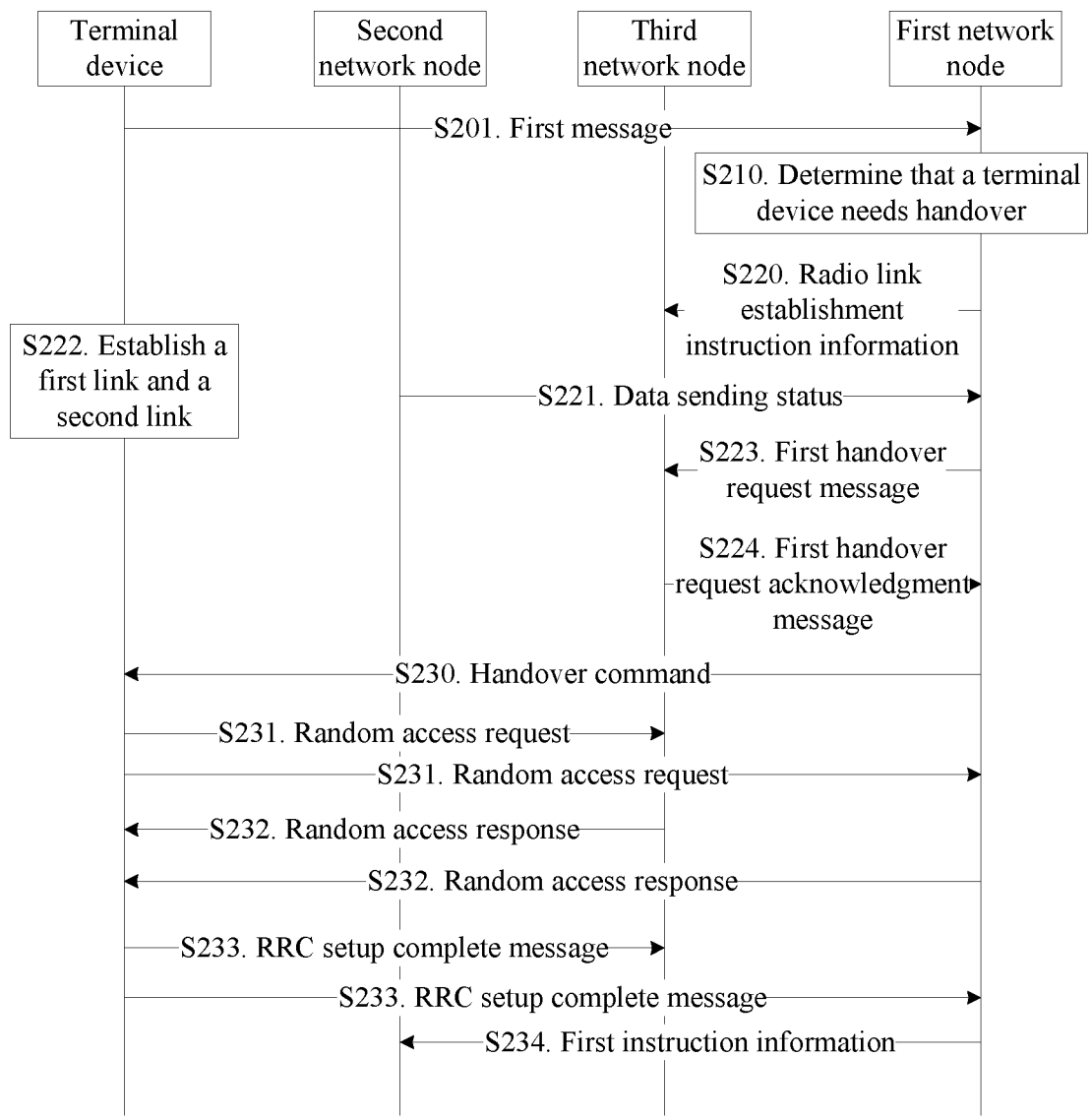
FIG. 7 is another schematic flowchart of a handover method according to an embodiment of this application.

FIG. 7 is a schematic flowchart of a handover method 200 according to an embodiment of this application. A first network node may correspond to a CU in FIG. 3, a second network node may correspond to a DU 1 in FIG. 3, and a third network node may correspond to a DU 2 in FIG. 3. As shown in FIG. 7, the method 200 includes the following steps.

S210: The first network node determines that a terminal device needs handover, where the handover is from the second network node to the third network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function. For example, the first network node may have a Packet Data Convergence Protocol layer function, a Service Data Adaptation Protocol layer function, and a radio resource control function, and the second network node and the third network node may each have a Radio Link Control layer function, a Media Access Control layer function, and a physical layer function.

Optionally, before S210 of determining, by the first network node, that the terminal device needs handover, the method 200 further includes the following step:

S201: The terminal device sends a first message to the first network node, where the first message is used to request the first network node to perform handover of the terminal device.

It should be understood that the first message may be a measurement report (Measurement Report), or may be load information or interference information. This application is not limited thereto.

Specifically, after receiving the first message, the first network node determines, based on the first message, that the terminal device needs to be handed over from the second network node to the third network node. The first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function.

Optionally, the second network node and the third network node are managed by the first network node.

For example, in FIG. 3, the DU 1 and the DU 2 are managed by the CU. After receiving a first message from the terminal device, the CU determines that the terminal device needs to be handed over from the DU 1 controlled by the CU to the DU 2 controlled by the CU. The CU has PDCP and RRC functions, and the DU 1 and the DU 2 each have an RLC/MAC/PHY function.

S220: When the handover is from the second network node to the third network node, the first network node sends radio link establishment instruction information to the third network node, where the radio link establishment instruction information is used to instruct the third network node to establish a radio link for the terminal device.

Optionally, the radio link establishment instruction information is used to instruct the third network node to establish a radio link for the terminal device, and the radio link is from the first network node to the third network node.

Specifically, when the first network node determines that the terminal device needs to be handed over from the second network node to the third network node, the first network node sends the radio link establishment instruction information to the third network node, and the radio link establishment instruction information is used to instruct the third network node to establish a radio link for the terminal device, so that the first network node or the terminal device or both transmit data on the new radio link.

Specifically, the radio link establishment instruction information may be a user equipment context setup request message. The first network node sends the user equipment context setup request message to the third network node. The third network node establishes the radio link for the terminal device based on the user equipment context setup request message.

For example, the user equipment context setup request message includes information about a bearer that is to be established for the terminal device, cell information, and the like. After receiving the user equipment context setup request message, the third network node completes context setup such as bearer setup for the terminal device, in other words, the radio link is successfully established.

Optionally, the method 200 further includes the following step:

S221: When the handover is from the second network node to the third network node, the first network node receives a data sending status sent by the second network node, where the data sending status is used to indicate a sequence number of data that is unsuccessfully sent to the terminal device.

Specifically, the first network node determines that data forwarding exists when the terminal device is handed over from the second network node to the third network node. For example, when transmission of downlink data is switched from a first link (the first network node the second network node the terminal device) to a second link (the first network node the third network node the terminal device), data may be lost. In this case, the first network node needs to retransmit the lost data. Specifically, the second network node sends the data sending status to the first network node, the data sending status is used to indicate the sequence number of the data that is unsuccessfully sent to the terminal device, and the first network node continues to send, to the third network node based on the data sending status, the data that is unsuccessfully sent to the terminal device.

For another example, for uplink data, the first network node receives data sent by the second network node, and determines an uplink data sending status based on the data sent by the second network node.

For example, for downlink data, the unsuccessfully sent data may be a piece of complete data, or may be a part or a segment of a piece of complete data. If the unsuccessfully sent data is a piece of complete data, the terminal device first sends a first data status report to the second network node, and the second network node may translate the first data status report into a data sending status, and notify the first network device of the data sending status.

For another example, if a radio link failure (Radio Link Failure, RLF) occurs on the first link, the second network node translates a latest data status report into a data sending status, and notifies the first network node of the data sending status.

It should be understood that the first network node may identify the data sending status, to determine a sequence number of successfully sent data, and send the unsuccessfully sent data to the third network node, so that the third network node sends the unsuccessfully sent data to the terminal device.

It should be further understood that when a part or a segment of a piece of complete data is unsuccessfully sent, in addition to sending a data sending status to the first network node, the second network node further needs to send data segmentation information to the third network node because data segmentation is completed on the second network node or the third network node. After receiving the segmentation information, the third network node may segment the unsuccessfully sent data sent by the first network node, to send an unsuccessfully sent data segment to the terminal device.

It should be understood that for uplink data, the first network node determines an uplink data sending status of the terminal device based on uplink data sent by the second network node, determines a sequence number of successfully sent data, and sends a sequence number of unsuccessfully sent data to the terminal device, so that the terminal device continues to send the unsuccessfully sent data to the first network node after being handed over to the third network node.

Figure 8:
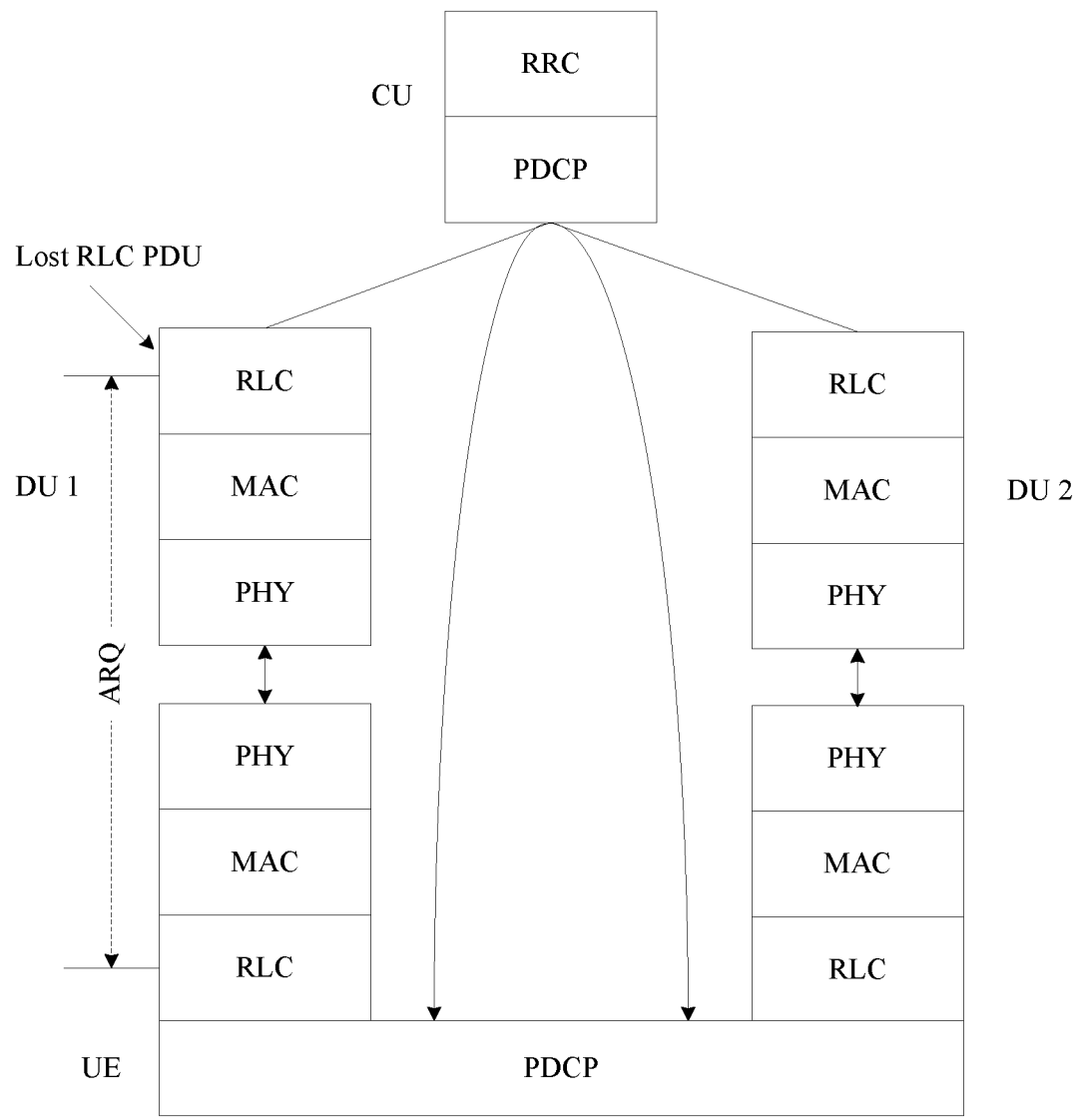
FIG. 8 is a schematic diagram of data status forwarding according to an embodiment of this application.

FIG. 8 is a schematic diagram of data forwarding in a CU-DU architecture. There are two forms of lost Radio Link Control protocol data units (Lost RLC PDU): a lost RLC PDU and a lost RLC PDU segment (data segment).

For a lost RLC PDU, UE sends an original RLC status report (RLC status report) to an RLC entity (DU 1) on a first link (CU-DU 1-UE), and the RLC entity on the first link translates the RLC status report into a PDCP status report, and notifies a PDCP entity (CU) of the PDCP status report.

The RLC entity on the first link translates a latest RLC status report into a PDCP status report, and notifies the PDCP entity of the PDCP status report.

The RLC entity only needs to notify the PDCP entity of a sequence number (SN) of the last one of received consecutive RLC PDUs, or an SN of the first lost RLC PDU, or an SN of a lost RLC PDU of consecutive RLC PDUs, and an SN of the last received RLC PDU. In this way, a correspondence between SNs of PDCP and RLC may be used for direct conversion between a PDCP DU and an RLC PDU, and data that needs to be retransmitted is sent to a second link (CU-DU 2-UE).

For a lost RLC PDU segment, the RLC entity on the first link needs to send a PDCP status report to the PDCP entity, and further needs to send data segmentation information to an RLC entity (DU 2) on the second link. After receiving the data segmentation information, the DU 2 may segment retransmitted data sent by the PDCP entity, to send an unsuccessfully sent data segment to the terminal device.

S230: The first network node sends a handover command to the terminal device, where the handover command is used to instruct the terminal device to perform the handover.

Optionally, before the terminal device receives the handover command, the method 200 further includes the following step:

S222: The terminal device establishes a first link and a second link, where the first link is a link from the first network node to the second network node, and the second link is a link from the first network node to the third network node.

Optionally, the first link and the second link each include a radio resource control configuration, and the radio resource control configuration includes at least one of a Radio Link Control layer, a Media Access Control layer, and a physical layer.

Specifically, as shown in FIG. 8, the UE may establish two protocol stacks before receiving the handover command, one protocol stack (which may be the first link) is activated, and the other protocol stack (which may be the second link) is deactivated. When the UE needs to be handed over from the activated link to the deactivated link, the UE is rapidly handed over to the deactivated link. In this case, all configurations, including RLC/MAC/PHY, of the deactivated link are completed at the beginning. When the UE needs to be handed over to the deactivated link, the deactivated link needs to be activated first, and the UE measures the deactivated link to determine that the deactivated link is available, and then directly transmits user plane data.

Optionally, after S221 of establishing the first link and the second link by the terminal device, the terminal device may measure and/or monitor the second link based on a specific period, to ensure that the second link is rapidly available.

For example, as shown in FIG. 8, when an RLF occurs on the activated link (UE-DU 1-CU) and the UE then needs to be handed over to the deactivated link (UE-DU 2-CU), the UE may determine, based on a measurement result, that the deactivated link is directly available and then directly transmit user plane data.

In an implementation, to save resources, when the terminal device measures and/or monitors the second link based on a specific period, the terminal device may set a timer 1, and the deactivated link is continuously measured and/or monitored before the timer times out. A measurement and/or monitoring period may be adjusted when the timer 1 times out, and a measurement and/or monitoring period longer than the current measurement period is set.

It should be understood that in S221, the terminal device may alternatively establish one link, for example, the first link, and the first link is from the first network node to the second network node. If a radio link failure occurs on the first link, the terminal device continues to measure and/or monitor the first link.

For example, as shown in FIG. 8, when the first link is disconnected due to an RLF or another reason, the UE saves all configurations including a configuration of RLC/MAC/PHY, and the UE keeps measuring or monitoring this link. After a radio link between the UE and the DU 1 recovers, user plane data can be immediately transmitted on this link.

In an implementation, to save resources, the terminal device sets a timer 2. Before the timer 2 times out, the configurations are retained, and the measuring or monitoring state is maintained. After the timer 2 times out, the measurement or monitoring period is extended. Therefore, resources are saved, and the terminal device stays in a monitoring state to facilitate fast handover.

Optionally, before S230 of sending the handover command to the terminal device by the first network node, the method further includes the following steps:

S223: The first network node sends a first handover request message to the third network node.

S224: The first network node receives a first handover request acknowledgment message sent by the third network node.

Specifically, when determining that the terminal device needs to be handed over from the second network node to the third network node, the first network node may send the first handover request message to the third network node. The first handover request message is used to indicate, to the third network node, that the terminal device needs to be handed over from the second network node to the third network node. The third network node receives the first handover request message, and sends the first handover request acknowledgment message to the first network node.

Optionally, the method 200 further includes the following steps:

S231: The terminal device sends a random access request to the first network node and the third network node.

S232: The first network node and the third network node send a random access response to the terminal device.

S233: The terminal device sends a radio resource control RRC setup complete message to the first network node and the third network node.

S234: The first network node sends first instruction information to the second network node, where the first instruction information is used to instruct the second network node to release context information of the terminal device.

According to the handover method in this embodiment of this application, fast handover of a terminal device can be ensured when some functions in a network device are distributed to different network nodes.

Figure 9:
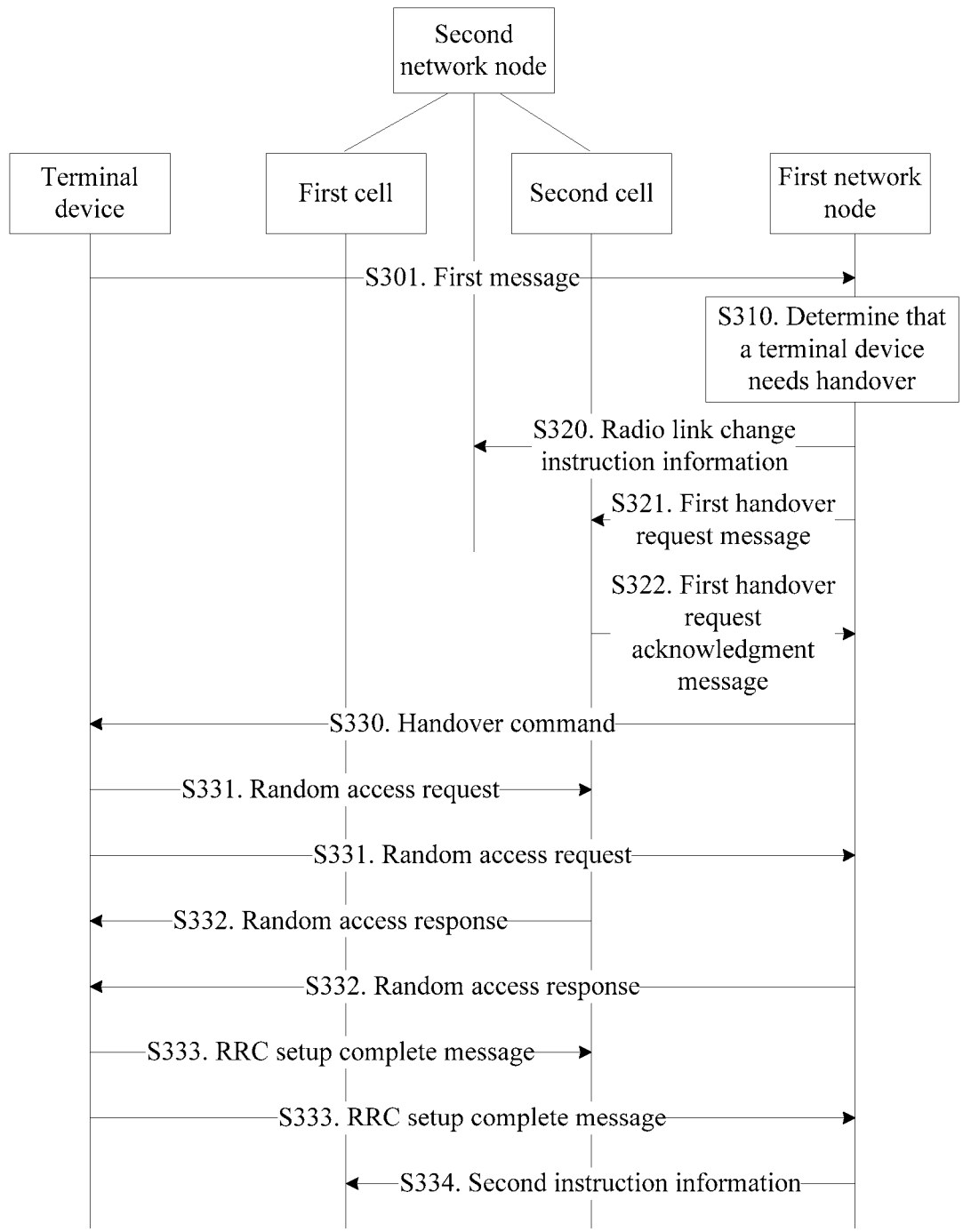
FIG. 9 is another schematic flowchart of a handover method according to an embodiment of this application.

FIG. 9 is a schematic flowchart of a handover method 300 according to an embodiment of this application. A first network node may correspond to a CU in FIG. 4, and a second network node may correspond to a DU in FIG. 4. As shown in FIG. 4, the method 300 includes the following steps.

S310: The first network node determines that a terminal device needs handover, where the handover is from a first cell of the second network node to a second cell of the second network node, the first network node includes at least one of a Packet Data Convergence Protocol layer function, a Service Data Adaptation Protocol layer function, and a radio resource control function, and the second network node includes at least one of a Radio Link Control layer function, a Media Access Control layer function, and a physical layer function.

Optionally, before S310 of determining, by the first network node, that the terminal device needs handover, the method 300 further includes the following step:

S301: The terminal device sends a first message to the first network node, where the first message is used to request the first network node to perform handover of the terminal device.

It should be understood that the first message may be a measurement report, or may be load information or interference information. This application is not limited thereto.

Specifically, after receiving the first message, the first network node determines, based on the first message, that the terminal device needs to be handed over from the first cell of the second network node to the second cell of the second network node. The first network node includes at least one of a Packet Data Convergence Protocol layer function, a Service Data Adaptation Protocol layer function, and a radio resource control function, and the second network node includes at least one of a Radio Link Control layer function, a Media Access Control layer function, and a physical layer function.

Optionally, the second network node is managed by the first network node.

S320: When the handover is from the first cell of the second network node to the second cell of the second network node, the first network node sends radio link change instruction information to the second network node, where the radio link change instruction information is used to instruct to switch a serving cell of the terminal device from the first cell to the second cell.

Specifically, after determining that the terminal device needs to be handed over from the first cell of the second network node to the second cell of the second network node, the first network node sends the radio link change instruction information to the second network node. The radio link change instruction information is used to instruct the second network node to switch the serving cell of the terminal device from the first cell to the second cell.

A specific implementation form of the radio link update instruction information may be a context modification request message for the terminal device. The context modification request message for the terminal device includes information used to instruct to switch the serving cell of the terminal device from the first cell to the second cell.

It should be understood that because an RLC layer is at the second network node, the second network node has information about all successfully sent data. Data forwarding is not required during handover between cells of the second network node.

S330: The first network node sends a handover command to the terminal device, where the handover command is used to instruct the terminal device to perform the handover.

Optionally, before S330 of sending the handover command to the terminal device by the first network node, the method further includes the following steps:

S321: The first network node sends a first handover request message to the second cell of the second network node.

S322: The first network node receives a first handover request acknowledgment message sent by the second cell of the second network node.

Specifically, when determining that the terminal device needs to be handed over from the first cell of the second network node to the second cell of the second network node, the first network node may send the first handover request message to the second cell of the second network node. The first handover request message is used to indicate, to the second cell of the second network node, that the terminal device needs to be handed over from the first cell of the second network node to the second cell of the second network node. The second cell of the second network node receives the first handover request message, and sends the first handover request acknowledgment message to the first network node.

Optionally, the method 300 further includes the following steps:

S331: The terminal device sends a random access request to the first network node and the second cell.

S332: The first network node and the second cell each send a random access response to the terminal device.

S333: The terminal device sends a radio resource control RRC setup complete message to the first network node and the second cell.

S334: The first network node sends second instruction information to the first cell, where the second instruction information is used to instruct the first cell to release context information of the terminal device.

According to the handover method in this embodiment of this application, fast handover of a terminal device can be ensured when some functions in a network device are distributed to different network nodes.

Figure 10A:
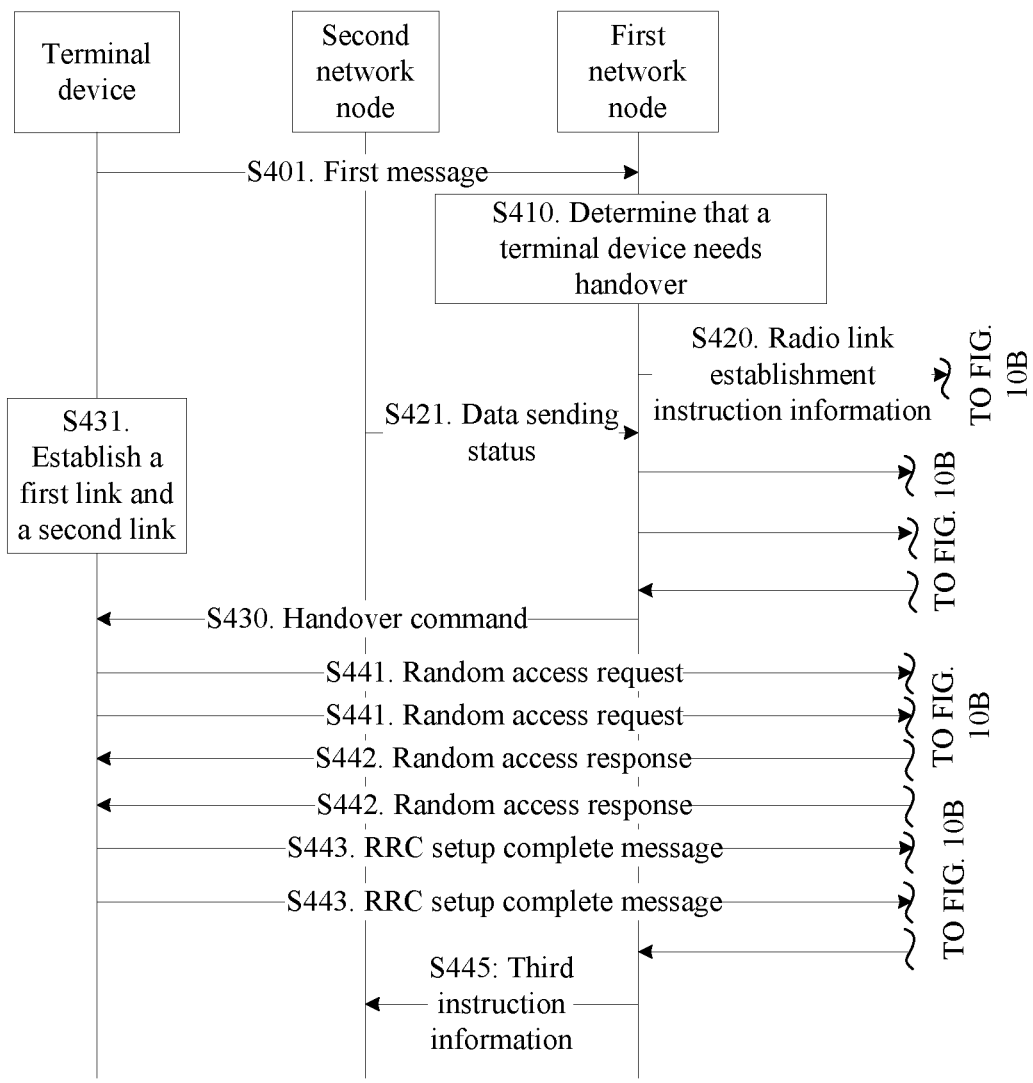
FIG. 10A and FIG. 10B are another schematic flowchart of a handover method according to an embodiment of this application.
Figure 10B:
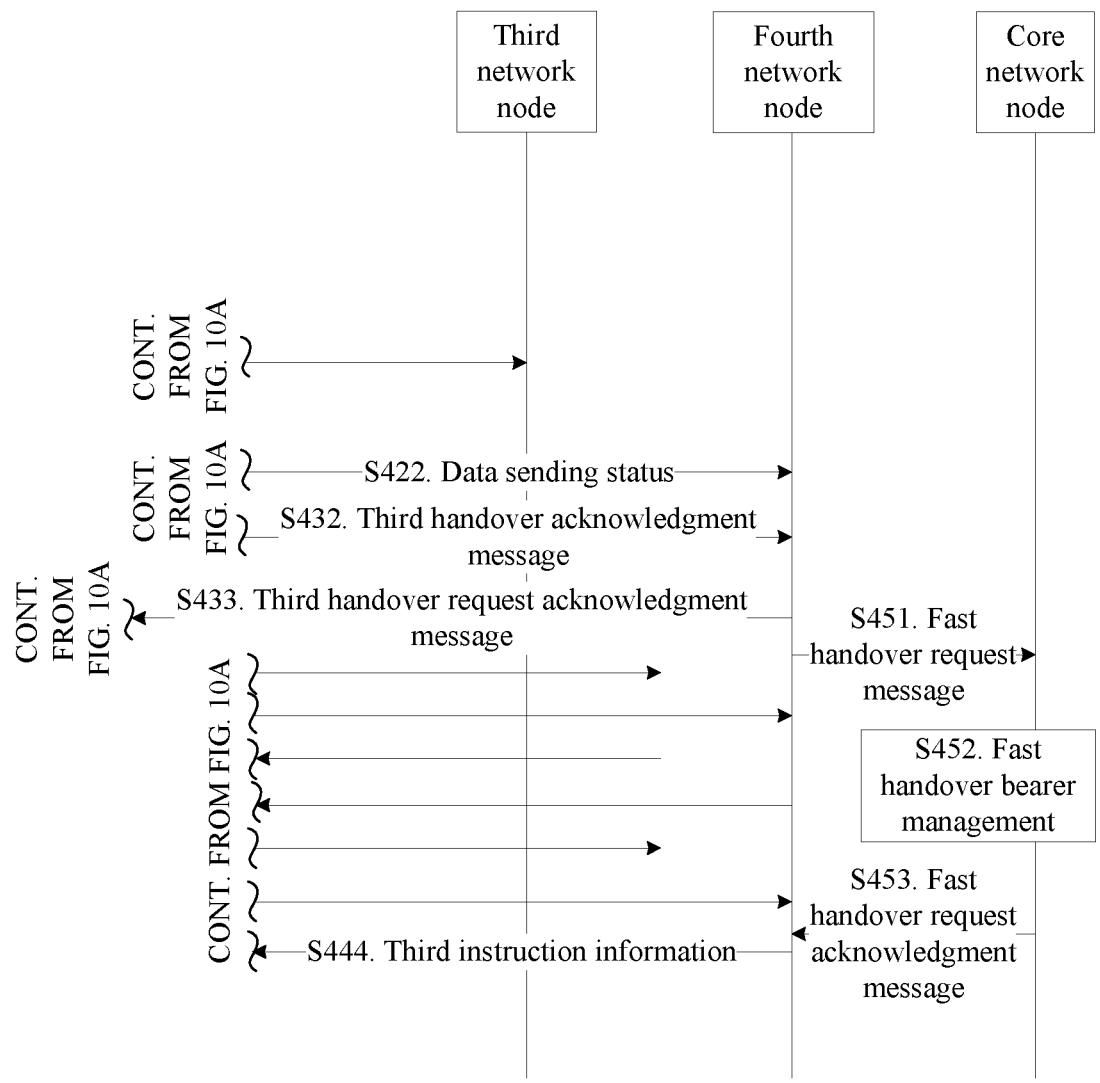

FIG. 10A and FIG. 10B are a schematic flowchart of a handover method 400 according to an embodiment of this application. A first network node may correspond to a source control node (S-CU) in FIG. 5, a second network node may correspond to a source data unit (S-DU) in FIG. 5, a third network node may correspond to a target data unit (T-DU) in FIG. 5, and a fourth network node may correspond to a target control node (S-CU) in FIG. 5. As shown in FIG. 10A and FIG. 10B, the method 400 includes the following steps.

S410: The first network node determines that a terminal device needs handover, where the handover is from the second network node controlled by the first network node to the third network node controlled by the fourth network node, the first network node and the fourth network node each include at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function.

Optionally, before S410 of determining, by the first network node, that the terminal device needs handover, the method 400 further includes the following steps:

S401: The terminal device sends a first message to the first network node, where the first message is used to request the first network node to perform handover of the terminal device.

It should be understood that the first message may be a measurement report, or may be load information or interference information. This application is not limited thereto.

Specifically, after receiving the first message, the first network node determines, based on the first message, that the terminal device needs to be handed over from the second network node controlled by the first network node to the third network node controlled by the fourth network node. The first network node and the fourth network node each include at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function.

S420: When the handover is from the second network node to the third network node, the first network node sends radio link establishment instruction information to the third network node, where the radio link establishment instruction information is used to instruct the third network node to establish a radio link for the terminal device.

Optionally, the radio link establishment instruction information is used to instruct the third network node to establish a radio link for the terminal device, and the radio link is from the first network node to the third network node.

Specifically, when the first network node determines that the terminal device needs to be handed over from the second network node to the third network node, the first network node sends the radio link establishment instruction information to the third network node, and the radio link establishment instruction information is used to instruct the third network node to establish a radio link for the terminal device, so that the first network node or the terminal device or both transmit data on the new radio link.

Optionally, the method 400 further includes the following steps:

S421: The first network node receives a data sending status sent by the second network node, where the data sending status is used to indicate a sequence number of data that is unsuccessfully sent to the terminal device.

S422: The first network node sends the data sending status to the fourth network node.

Specifically, the first network node determines that data forwarding exists when the terminal device is handed over from the second network node controlled by the first network node to the third network node controlled by the fourth network node. To be specific, when transmission of downlink data is switched from a first link (the first network node the second network node the terminal device) to a second link (the fourth network node the third network node the terminal device), data may be lost. In this case, the first network node needs to retransmit the lost data. The second network node may send an automatic repeat request (Automatic Repeat Request, ARQ) to the first network node. Specifically, the second network node sends the data sending status to the first network node, the data sending status is used to indicate the sequence number of the data that is unsuccessfully sent to the terminal device, and the first network node forwards the data sending status to the fourth network node, so that the fourth network node sends the unsuccessfully sent data to the third network node. The fourth network node continues to send, to the third network node based on the data sending status, the data that is unsuccessfully sent to the terminal device.

For another example, for uplink data, the first network node receives data sent by the second network node, and determines an uplink data sending status based on the data sent by the second network node.

For example, the unsuccessfully sent data may be a piece of complete data, or may be a part or a segment of a piece of complete data. If the unsuccessfully sent data is a piece of complete data, the terminal device first sends a first data status report to the second network node, and the second network node may translate the first data status report into a data sending status.

It should be understood that for uplink data, the first network node determines an uplink data sending status of the terminal device based on uplink data sent by the second network node, determines a sequence number of successfully sent data, and sends a sequence number of unsuccessfully sent data to the terminal device, so that the terminal device continues to send the unsuccessfully sent data to the fourth network node after being handed over to the third network node.

For another example, if a radio link failure (Radio Link Failure, RLF) occurs on the first link, the second network node translates a latest data status report into a data sending status, and notifies the first network node of the data sending status.

It should be understood that the first network node may identify the data sending status, to determine a sequence number of successfully sent data, and send the unsuccessfully sent data to the third network node, so that the third network node sends the unsuccessfully sent data to the terminal device.

It should be further understood that when a part or a segment of a piece of complete data is unsuccessfully sent, in addition to sending a data sending status to the first network node, the second network node further needs to send data segmentation information to the third network node because data segmentation is completed on the second network node or the third network node. After receiving the segmentation information, the third network node may segment the unsuccessfully sent data sent by the first network node, to send an unsuccessfully sent data segment to the terminal device.

Figure 11:
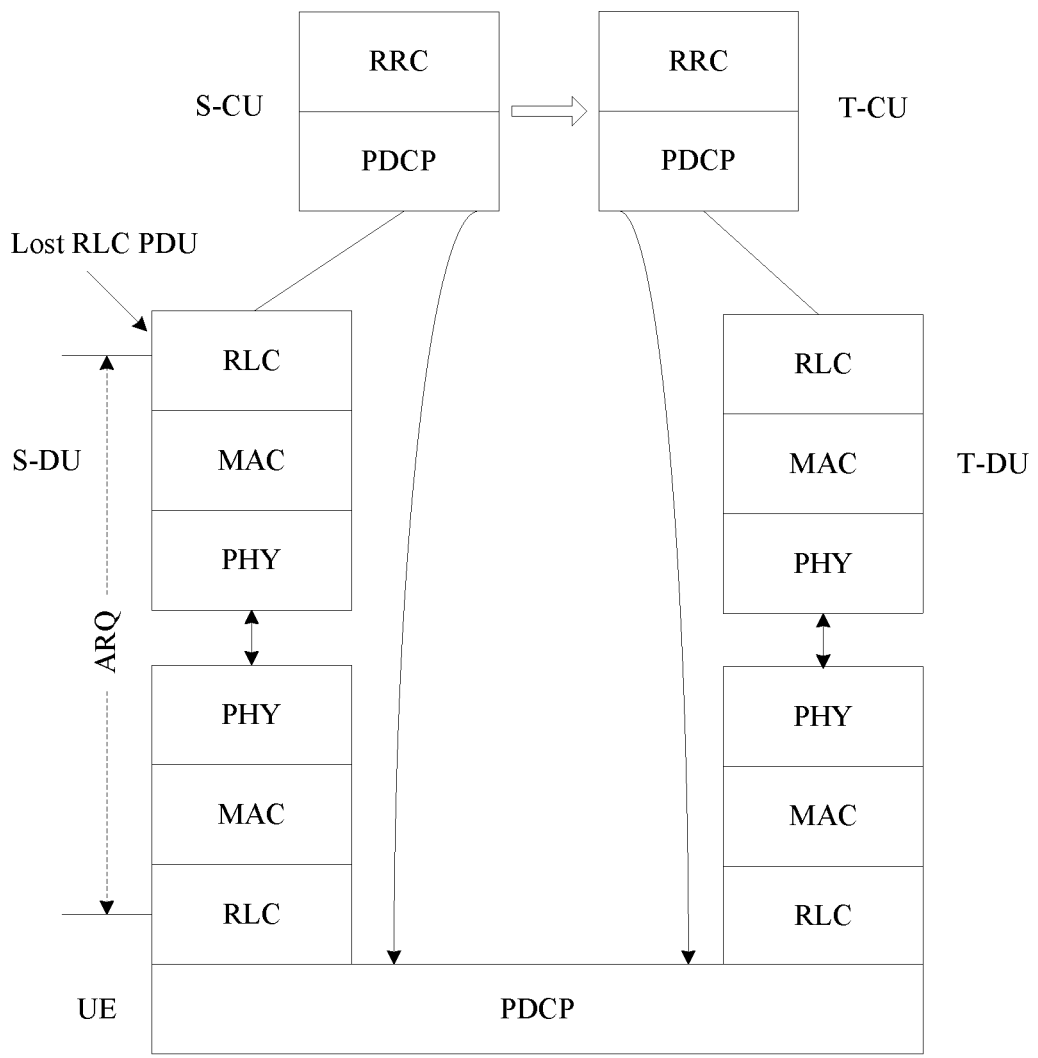
FIG. 11 is another schematic diagram of data status forwarding according to an embodiment of this application.

FIG. 11 is a schematic diagram of data forwarding in a CU-DU architecture. There are two forms of lost Radio Link Control protocol data units (Lost RLC PDU): a lost RLC PDU and a lost RLC PDU segment (data segment).

For a lost RLC PDU, UE sends an original RLC status report (RLC status report) to an RLC entity (S-DU) on a first link ((S-CU)-(S-DU)-UE), and the RLC entity on the first link translates the RLC status report into a PDCP status report, and notifies a PDCP entity (S-CU) on the first link of the PDCP status report. The S-CU forwards the PDCP status report to a PDCP entity (T-CU) on a second link ((T-CU)-(T-DU)-UE).

If an RLF occurs on the first link, the RLC entity on the first link translates a latest RLC status report into a PDCP status report, and notifies the PDCP entity of the PDCP status report.

The S-CU or the T-CU needs to attempt to identify the RLC status report: the lost RLC PDU. An SN of the lost RLC PDU corresponds to an SN of PDCP. Therefore, the S-DU only needs to notify the S-CU of an SN of the last one of received consecutive RLC PDUs, or an SN of the first lost RLC PDU, or an SN of a lost RLC PDU of consecutive RLC PDUs, and an SN of the last received RLC PDU. In this way, the T-CU may perform direct conversion between a PDCP DU and an RLC PDU by using a correspondence between SNs of PDCP and RLC, and send, to the T-DU, data that needs to be retransmitted.

For a lost RLC PDU segment, the S-DU needs to send the PDCP status report to the S-CU, and further needs to send data segmentation information to the T-DU. After receiving the data segmentation information, the T-DU may segment retransmitted data sent by the T-CU, to send an unsuccessfully sent data segment to the terminal device.

S430: The first network node sends a handover command to the terminal device, where the handover command is used to instruct the terminal device to perform the handover.

Optionally, before the terminal device receives the handover command, the method 200 further includes the following step:

S431: The terminal device establishes a first link and a second link, where the first link is a link from the first network node to the second network node, and the second link is a link from the fourth network node to the third network node.

Optionally, the first link and the second link each include a radio resource control configuration, and the radio resource control configuration includes at least one of a Radio Link Control layer, a Media Access Control layer, and a physical layer.

Specifically, as shown in FIG. 11, the UE may establish two protocol stacks before receiving the handover command, one protocol stack (which may be the first link) is activated, and the other protocol stack (which may be the second link) is deactivated. When the UE needs to be handed over from the activated link to the deactivated link, the UE is rapidly handed over to the deactivated link. In this case, all configurations, including RLC/MAC/PHY, of the deactivated link are completed at the beginning. When the UE needs to be handed over to the deactivated link, the deactivated link needs to be activated first, and the UE measures the deactivated link to determine that the deactivated link is available, and then directly transmits user plane data.

Optionally, after S431 of establishing the first link and the second link by the terminal device, the terminal device may measure and/or monitor the second link based on a specific period, to ensure that the second link is rapidly available.

For example, as shown in FIG. 11, when an RLF occurs on the activated link ((S-CU)-(S-DU)-UE) and the UE needs to be handed over to the deactivated link ((T-CU)-(T-DU)-UE), the UE may determine, based on a measurement report, that the deactivated link is directly available and then directly transmit user plane data.

In an implementation, to save resources, when the terminal device measures and/or monitors the second link based on a specific period, the terminal device may set a timer timer 3, and the deactivated link is continuously measured and/or monitored before the timer times out. A measurement and/or monitoring period may be adjusted when the timer 3 times out, and a measurement and/or monitoring period longer than the current measurement period is set.

It should be understood that in S431, the terminal device may alternatively establish one link, for example, the first link, and the first link is from the first network node to the second network node. If a radio link failure occurs on the first link, the terminal device continues to measure and/or monitor the first link.

For example, as shown in FIG. 11, when the first link is disconnected due to an RLF or another reason, the UE saves all configurations including a configuration of RLC/MAC/PHY, and the UE keeps measuring or monitoring this link. After a radio link between the UE and the S-DU recovers, user plane data can be immediately transmitted on this link.

In an implementation, to save resources, the terminal device sets a timer 4. Before the timer 4 times out, the configurations are retained, and the measuring or monitoring state is maintained. After the timer 4 times out, the measurement or monitoring period is extended. Therefore, resources are saved, and the terminal device stays in a monitoring state to facilitate fast handover.

Optionally, before S440 of sending the handover command to the terminal device by the first network node, the method further includes the following steps:

S432: The first network node sends a third handover request message to the fourth network node.

S433: The first network node receives a third handover request acknowledgment message sent by the fourth network node.

Specifically, when determining that the terminal device needs to be handed over from the second network node controlled by the first network node to the third network node controlled by the fourth network node, the first network node may send the third handover request message to the fourth network node. The third handover request message is used to indicate, to the fourth network node, that the terminal device needs to be handed over from the second network node to the third network node. The fourth network node receives the third handover request message, and sends the third handover request acknowledgment message to the first network node.

Optionally, the method 400 further includes the following steps:

S441: The terminal device sends a random access request to the third network node and the fourth network node.

S442: The third network node and the fourth network node each send a random access response to the terminal device.

S443: The terminal device sends a radio resource control RRC setup complete message to the third network node and the fourth network node.

S444: The fourth network node sends third instruction information to the first network node, where the third instruction information is used to instruct the second network node to release context information of the terminal device.

S445: The first network node sends the third instruction information to the second network node.

According to the handover method in this embodiment of this application, inter-CU handover in the CU-DU architecture can be implemented, and this helps ensure normal communication of the terminal device in the CU-DU architecture.

Optionally, the fourth network node further needs to request a core network node to perform handover, and this procedure may be implemented by using the following steps:

S451: The fourth network node sends a fast handover request message to the core network node.

S452: The core network node performs fast handover bearer management.

S453: The core network node sends a fast handover request acknowledgment message to the fourth network node.

According to the handover method in this embodiment of this application, fast handover of a terminal device can be ensured when some functions in a network device are distributed to different network nodes.

The handover method according to the embodiments of this application is described above in detail with reference to FIG. 6 to FIG. 11. A terminal device and a network device according to embodiments of this application are described below in detail with reference to FIG. 12 to FIG. 21.

Figure 12:
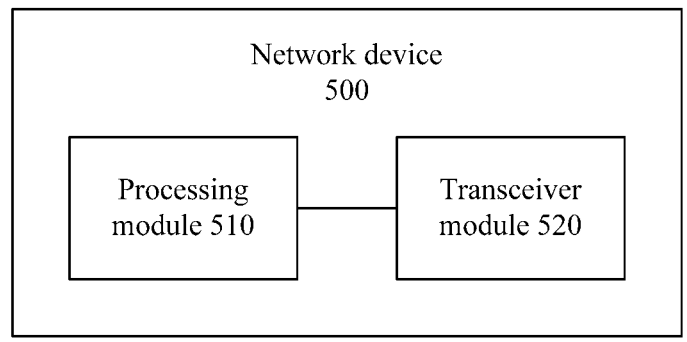
FIG. 12 is a schematic block diagram of a network device according to an embodiment of this application.

FIG. 12 is a schematic block diagram of a network device 500 according to an embodiment of this application. As shown in FIG. 12, the network device 500 includes:

a processing module 510, configured to determines that a terminal device needs handover, where the handover is from a second network node to a third network node, or the handover is from a first cell of the second network node to a second cell of the second network node, a first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; and a transceiver module 520, configured to: when the handover is from the second network node to the third network node, send, by the first network node, radio link establishment instruction information to the third network node, where the radio link establishment instruction information is used to instruct the third network node to establish a radio link for the terminal device, where the transceiver module 520 is further configured to: when the handover is from the first cell of the second network node to the second cell of the second network node, send, by the first network node, radio link change instruction information to the second network node, where the radio link change instruction information is used to instruct to switch a serving cell of the terminal device from the first cell to the second cell; and the transceiver module 520 is further configured to send, by the first network node, a handover command to the terminal device, where the handover command is used to instruct the terminal device to perform the handover.

Optionally, the second network node and the third network node are managed by the first network node.

Optionally, when the handover is from the second network node to the third network node, the transceiver module 520 is further configured to receive a data sending status sent by the second network node, where the data sending status is used to indicate a sequence number of data that is unsuccessfully sent to the terminal device; and the transceiver module 520 is further configured to send, under the control of the processing module 510, the unsuccessfully sent data to the third network node based on the data sending status.

Optionally, the transceiver module 520 is further configured to:

send a first handover request message to the third network node; and receive a first handover request acknowledgment message sent by the third network node.

Optionally, the transceiver module 520 is further configured to:

receive a random access request sent by the terminal device;

send a random access response to the terminal device;

receive a radio resource control setup complete message sent by the terminal device; and send instruction information to the second network node, where the instruction information is used to instruct the second network node to release context information of the terminal device.

Optionally, the second network node is managed by the first network node, the third network node is managed by a fourth network node, and the fourth network node includes a Packet Data Convergence Protocol layer function and a radio resource control function.

Optionally, the transceiver module 520 is further configured to:

receive a data sending status sent by the second network node, where the data sending status is used to indicate data that is unsuccessfully sent to the terminal device; and send the data sending status to the fourth network node, so that the fourth network node sends the unsuccessfully sent data to the third network node.

Optionally, the transceiver module 520 is further configured to:

send a second handover request message to the fourth network node; and receive a second handover request acknowledgment message sent by the fourth network node.

Optionally, the transceiver module 520 is further configured to:

send instruction information to the second network node, where the instruction information is used to instruct the second network node to release context information of the terminal device.

According to the network device in this embodiment of this application, fast handover of a terminal device can be ensured when some functions in the network device are distributed to different network nodes.

Figure 13:
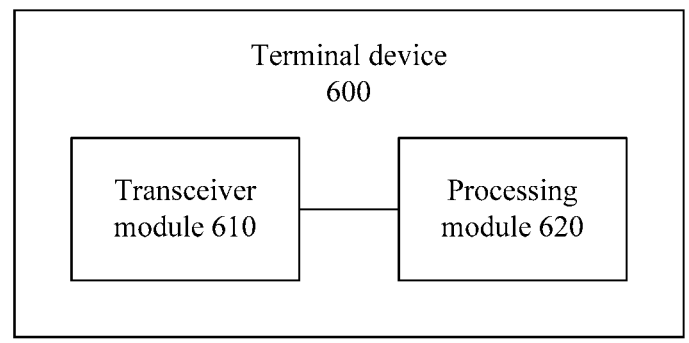
FIG. 13 is a schematic block diagram of a terminal device according to an embodiment of this application.

FIG. 13 is a schematic block diagram of a terminal device 600 according to an embodiment of this application. As shown in FIG. 13, the terminal device 600 includes:

a transceiver module 610, configured to send a first message to a first network node, where the first message is used to request the first network node to perform handover of the terminal device, the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; and the transceiver module 610 is further configured to receive a handover command sent by the first network node, where the handover command is used to instruct to perform the handover.

Optionally, the second network node and the third network node are managed by the first network node.

Optionally, the terminal device 600 further includes: a processing module 620, configured to establish a first link and a second link, where the first link is a link from the first network node to the second network node, and the second link is a link from the first network node to the third network node;

the processing module 620 is further configured to determine to hand over from the first link to the second link; and the transceiver module 610 is further configured to transmit user plane data on the second link.

Optionally, the processing module 620 is further configured to: measure and/or monitor, the second link based on a first period.

Optionally, the processing module 620 is further configured to establish a first link, where the first link is a link from the first network node to the second network node;

the processing module 620 is further configured to: if a radio link failure occurs on the first link, continue to measure and/or monitor the first link; and the transceiver module 610 is configured to: when the first link recovers, transmit, by the terminal device, user plane data on the first link.

Optionally, the transceiver module 610 is further configured to: send a random access request to the first network node and the third network node;

receive random access responses sent by the first network node and the third network node; and send a radio resource control setup complete message to the first network node and the third network node.

Optionally, the second network node is managed by the first network node, the third network node is managed by a fourth network node, and the fourth network node includes at least one of a Packet Data Convergence Protocol layer function, a Service Data Adaptation Protocol layer function, and a radio resource control function.

Optionally, the transceiver module 610 is further configured to: send a random access request to the third network node and the fourth network node;

receive random access responses sent by the third network node and the fourth network node; and send a radio resource control setup complete message to the third network node and the fourth network node.

According to the terminal device in this embodiment of this application, fast handover of the terminal device can be ensured when some functions in a network device are distributed to different network nodes.

Figure 14:
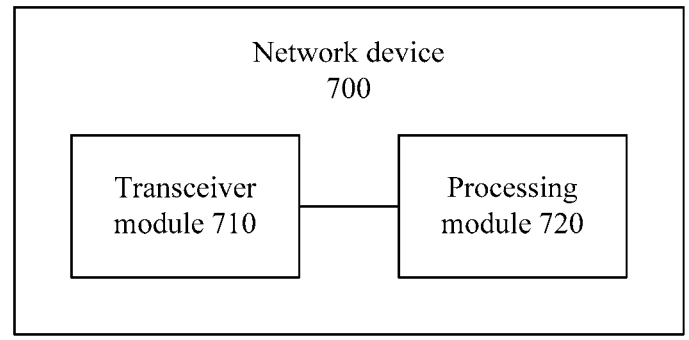
FIG. 14 is another schematic block diagram of a network device according to an embodiment of this application.

FIG. 14 is a schematic block diagram of a network device 700 according to an embodiment of this application. As shown in FIG. 14, the network device 700 includes:

a transceiver module 710, configured to receive a handover command sent by a first network node, where the handover command is used to instruct to perform handover of a terminal device, the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function, where when the handover is from the first cell of the second network node to the second cell of the second network node, the transceiver module 710 is further configured to receive radio link change instruction information sent by the first network node, where the radio link change instruction information is used to instruct to switch a serving cell of the terminal device from the first cell to the second cell; and a processing module 720, configured to release context information of the terminal device based on the handover command.

Optionally, the second network node and the third network node are managed by the first network node.

Optionally, the second network node is managed by the first network node, the third network node is managed by a fourth network node, and the fourth network node includes a Packet Data Convergence Protocol layer function and a radio resource control function.

Optionally, the transceiver module 710 is further configured to:

send a data sending status to the first network node, where the data sending status is used to indicate a sequence number of data that is unsuccessfully sent to the terminal device;

or receive cell change instruction information sent by the first network node, where the cell change instruction information is used to instruct to switch a serving cell of the terminal device from the first cell to the second cell.

Optionally, the transceiver module 710 is further configured to:

send data segmentation information to the third network node, where the data segmentation information is used to indicate segmentation information of data that is unsuccessfully sent to the terminal device.

According to the network device in this embodiment of this application, fast handover of a terminal device can be ensured when some functions in the network device are distributed to different network nodes.

Figure 15:
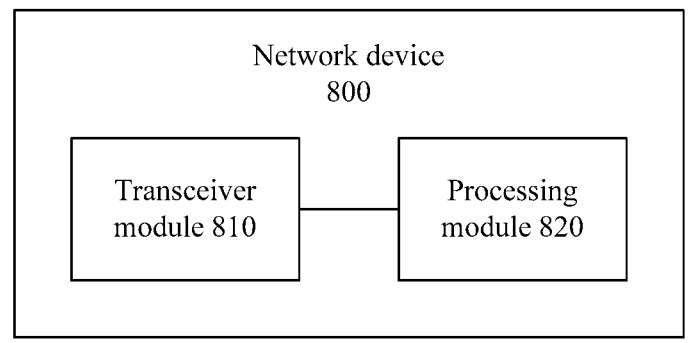
FIG. 15 is still another schematic block diagram of a network device according to an embodiment of this application.

FIG. 15 is a schematic block diagram of a network device 800 according to an embodiment of this application. As shown in FIG. 15, the network device 800 includes:

a transceiver module 810, configured to receive a first handover request message sent by a first network node, where the first handover request message is used to instruct to perform handover of a terminal device, the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function, where when the handover is from the second network node to the third network node, the transceiver module 810 is further configured to receive radio link establishment instruction information sent by the first network node, where the radio link establishment instruction information is used to instruct the third network node to establish a radio link for the terminal device; and a processing module 820, configured to control the transceiver module 810 to send a first handover request acknowledgment message to the first network node, where the first handover request acknowledgment message is used to acknowledge the handover of the terminal device.

Optionally, the second network node and the third network node are managed by the first network node.

Optionally, the second network node is managed by the first network node, the third network node is managed by a fourth network node, and the fourth network node includes a Packet Data Convergence Protocol layer function and a radio resource control function.

Optionally, the transceiver module 810 is further configured to receive data segmentation information sent by the second network node, where the data segmentation information is used to indicate a data segment that is unsuccessfully sent to the terminal device; and the processing module 820 is further configured to send the unsuccessfully sent data segment to the terminal device based on the data segmentation information.

According to the network device in this embodiment of this application, fast handover of a terminal device can be ensured when some functions in the network device are distributed to different network nodes.

Figure 16:
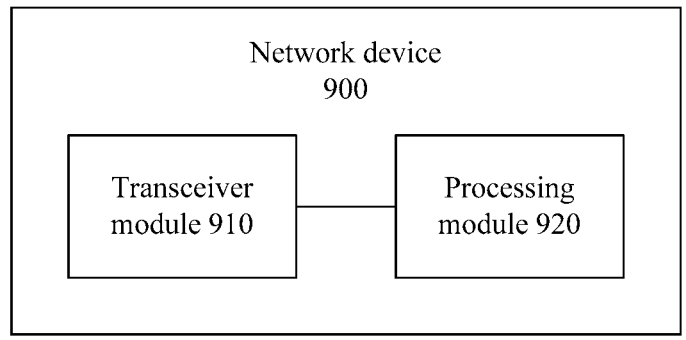
FIG. 16 is still another schematic block diagram of a network device according to an embodiment of this application.

FIG. 16 is a schematic block diagram of a network device 900 according to an embodiment of this application. As shown in FIG. 16, the network device 900 includes:

a transceiver module 910, configured to receive a second handover request message sent by a first network node, where the second handover request message is used to instruct to perform handover of a terminal device, the handover is from a second network node to a third network node, the second network node is managed by the first network node, the third network node is managed by a fourth network node, the first network node and the fourth network node each include at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function, where when the handover is from the second network node to the third network node, the transceiver module 910 is further configured to receive a data sending status sent by the first network node, where the data sending status is used to indicate a sequence number of data that is unsuccessfully sent to the terminal device; and a processing module 920, configured to control the transceiver module 910 to send a second handover request acknowledgment message to the first network node, where the second handover request acknowledgment message is used to acknowledge the handover of the terminal device.

Optionally, the processing module 920 is further configured to send the unsuccessfully sent data to the third network node based on the data sending status.

Optionally, the transceiver module 910 is further configured to: receive a random access request sent by the terminal device;

send a random access response to the terminal device;

receive a radio resource control setup complete message sent by the terminal device; and send instruction information to the first network node, where the instruction information is used to instruct the second network node to release context information of the terminal device.

Optionally, the transceiver module 910 is further configured to: send a third handover request message to a core network node; and receive a third handover request acknowledgment message sent by the core network node.

According to the network device in this embodiment of this application, fast handover of a terminal device can be ensured when some functions in the network device are distributed to different network nodes.

Figure 17:
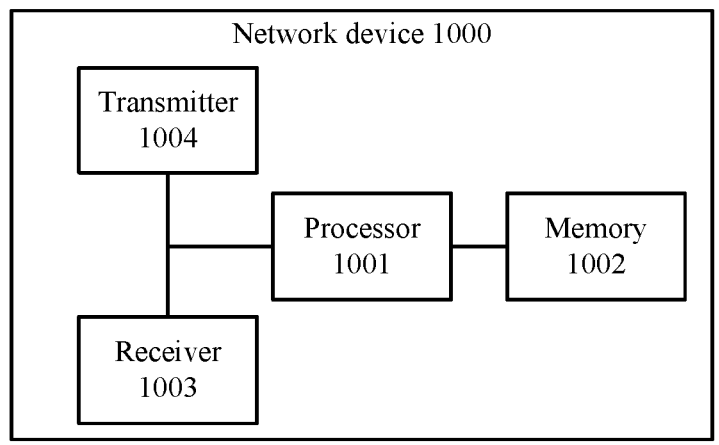
FIG. 17 is a schematic block diagram of a network device according to an embodiment of this application.

FIG. 17 is a schematic structural diagram of a network device 1000 according to an embodiment of this application. As shown in FIG. 17, the network device 1000 includes a processor 1001, a memory 1002, a receiver 1003, and a transmitter 1004. These parts are in communicative connection with each other. The memory 1002 is configured to store an instruction, and the processor 1001 is configured to execute the instruction stored in the memory 1002, and control the receiver 1003 to receive information and control the transmitter 1004 to send information.

The processor 1001 is configured to execute the instruction stored in the memory 1002, the processor 1001 may be configured to perform operations and/or functions corresponding to the processing module 510 in the network device 500, and the receiver 1003 and the transmitter 1004 may be configured to perform operations and/or functions corresponding to the transceiver module 520 in the network device 500. For brevity, details are not described again herein.

Figure 18:
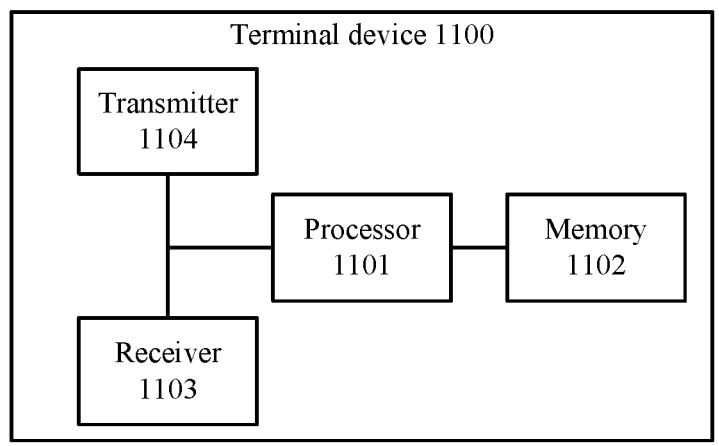
FIG. 18 is a schematic block diagram of a terminal device according to an embodiment of this application.

FIG. 18 is a schematic structural diagram of a terminal device 1100 according to an embodiment of this application. As shown in FIG. 18, the terminal device 1100 includes a processor 1101, a memory 1102, a receiver 1103, and a transmitter 1104. These parts are in communicative connection with each other. The memory 1102 is configured to store an instruction, and the processor 1101 is configured to execute the instruction stored in the memory 1102, and control the receiver 1103 to receive information and control the transmitter 1104 to send information.

The processor 1101 is configured to execute the instruction stored in the memory 1102, the processor 1101 may be configured to perform operations and/or functions corresponding to the processing module 620 in the terminal device 600, and the receiver 1103 and the transmitter 1104 may be configured to perform operations and/or functions corresponding to the transceiver module 610 in the terminal device 600. For brevity, details are not described again herein.

Figure 19:
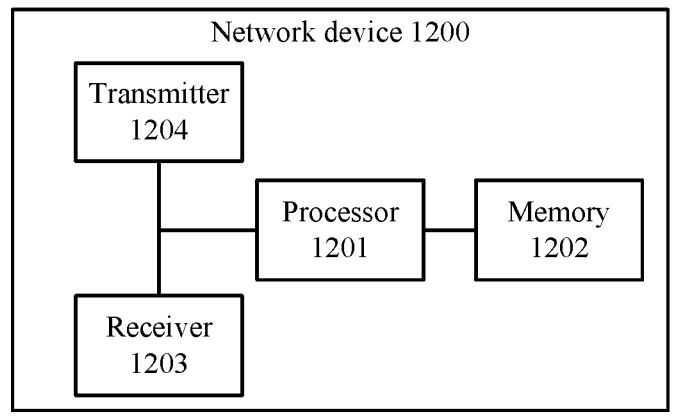
FIG. 19 is another schematic block diagram of a network device according to an embodiment of this application.

FIG. 19 is a schematic structural diagram of a network device 1200 according to an embodiment of this application. As shown in FIG. 19, the network device 1200 includes a processor 1201, a memory 1202, a receiver 1203, and a transmitter 1204. These parts are in communicative connection with each other. The memory 1202 is configured to store an instruction, and the processor 1201 is configured to execute the instruction stored in the memory 1202, and control the receiver 1203 to receive information and control the transmitter 1204 to send information.

The processor 1201 is configured to execute the instruction stored in the memory 1202, the processor 1201 may be configured to perform operations and/or functions corresponding to the processing module 720 in the network device 700, and the receiver 1203 and the transmitter 1204 may be configured to perform operations and/or functions corresponding to the transceiver module 710 in the network device 700. For brevity, details are not described again herein.

Figure 20:
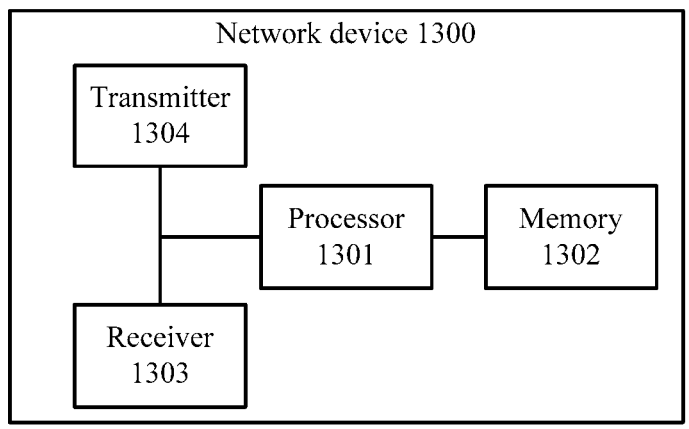
FIG. 20 is still another schematic block diagram of a network device according to an embodiment of this application.

FIG. 20 is a schematic structural diagram of a network device 1300 according to an embodiment of this application. As shown in FIG. 20, the network device 1300 includes a processor 1301, a memory 1302, a receiver 1303, and a transmitter 1304. These parts are in communicative connection with each other. The memory 1302 is configured to store an instruction, and the processor 1301 is configured to execute the instruction stored in the memory 1302, and control the receiver 1303 to receive information and control the transmitter 1304 to send information.

The processor 1301 is configured to execute the instruction stored in the memory 1302, the processor 1301 may be configured to perform operations and/or functions corresponding to the processing module 820 in the network device 800, and the receiver 1303 and the transmitter 1304 may be configured to perform operations and/or functions corresponding to the transceiver module 810 in the network device 800. For brevity, details are not described again herein.

Figure 21:
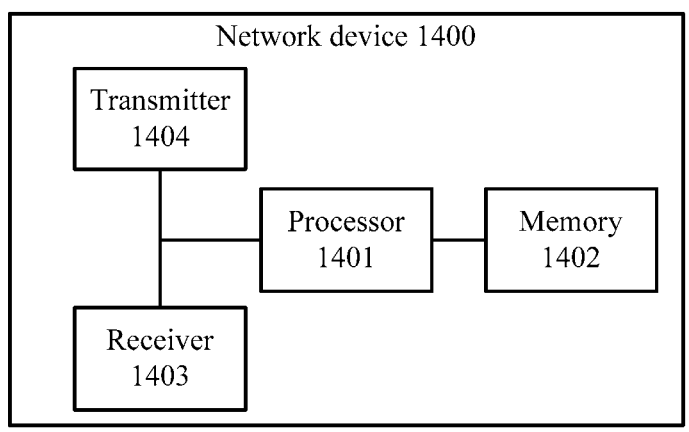
FIG. 21 is still another schematic block diagram of a network device according to an embodiment of this application.

FIG. 21 is a schematic structural diagram of a network device 1400 according to an embodiment of this application. As shown in FIG. 21, the network device 1400 includes a processor 1401, a memory 1402, a receiver 1403, and a transmitter 1404. These parts are in communicative connection with each other. The memory 1402 is configured to store an instruction, and the processor 1401 is configured to execute the instruction stored in the memory 1402, and control the receiver 1403 to receive information and control the transmitter 1404 to send information.

The processor 1401 is configured to execute the instruction stored in the memory 1402, the processor 1401 may be configured to perform operations and/or functions corresponding to the processing module 920 in the network device 900, and the receiver 1403 and the transmitter 1404 may be configured to perform operations and/or functions corresponding to the transceiver module 910 in the network device 900. For brevity, details are not described again herein.

An embodiment of this application further provides a system chip, including an input/output interface, at least one processor, at least one memory, and a bus. The at least one memory is configured to store an instruction, and the at least one processor is configured to invoke the instruction in the at least one memory, to perform operations in the methods in the foregoing aspects.

This application further provides the following related embodiments (it should be noted that the numbering manner used above in the specification of this application is not used in the following embodiments):

Embodiment 1: A handover method includes: learning, by a first network node, that a terminal device needs handover, where the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; when the handover is from the second network node to the third network node, sending, by the first network node, radio link establishment instruction information to the third network node, where the radio link establishment instruction information is used to instruct the third network node to establish a radio link for the terminal device; when the handover is from the first cell of the second network node to the second cell of the second network node, sending, by the first network node, radio link change instruction information to the second network node, where the radio link change instruction information is used to instruct to switch a serving cell of the terminal device from the first cell to the second cell; and sending, by the first network node, a handover command to the terminal device, where the handover command is used to instruct the terminal device to perform the handover.

Embodiment 2: In the method according to Embodiment 1, the second network node and the third network node are managed by the first network node.

Embodiment 3: In the method according to Embodiment 2, when the handover is from the second network node to the third network node, the method further includes: receiving, by the first network node, a data sending status sent by the second network node, where the data sending status is used to indicate a sequence number of data that is unsuccessfully sent to the terminal device; and sending, by the first network node, the unsuccessfully sent data to the third network node based on the data sending status.

Embodiment 4: In the method according to Embodiment 3, before the sending, by the first network node, a handover command to the terminal device, the method further includes: sending, by the first network node, a first handover request message to the third network node; and receiving, by the first network node, a first handover request acknowledgment message sent by the third network node.

Embodiment 5: In the method according to Embodiment 3 or 4, after the sending, by the first network node, a handover command to the terminal device, the method further includes: receiving, by the first network node, a random access request sent by the terminal device; sending, by the first network node, a random access response to the terminal device; receiving, by the first network node, a radio resource control setup complete message sent by the terminal device; and sending, by the first network node, instruction information to the second network node, where the instruction information is used to instruct the second network node to release context information of the terminal device.

Embodiment 6: In the method according to Embodiment 1, the second network node is managed by the first network node, the third network node is managed by a fourth network node, and the fourth network node includes a Packet Data Convergence Protocol layer function and a radio resource control function.

Embodiment 7: In the method according to Embodiment 6, when the handover is from the second network node to the third network node, the method further includes: sending, by the first network node, a data sending status to the fourth network node, so that the fourth network node sends unsuccessfully sent data to the third network node, where the data sending status is used to indicate a sequence number of the data that is unsuccessfully sent to the terminal device.

Embodiment 8: In the method according to Embodiment 6 or 7, before the sending, by the first network node, a handover command to the terminal device, the method further includes: sending, by the first network node, a second handover request message to the fourth network node; and receiving, by the first network node, a second handover request acknowledgment message sent by the fourth network node.

Embodiment 9: In the method according to Embodiment 7 or 8, after the sending, by the first network node, a handover command to the terminal device, the method further includes: sending, by the first network node, instruction information to the second network node, where the instruction information is used to instruct the second network node to release context information of the terminal device.

Embodiment 10: A network device includes: a memory, configured to store an instruction; and a processor, configured to invoke the instruction in the memory, to perform operations of the method according to any one of Embodiments 1 to 9.

Embodiment 11: A handover method includes: sending, by a terminal device, a first message to a first network node, where the first message is used to request the first network node to perform handover of the terminal device, the handover is from a second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; and receiving, by the terminal device, a handover command sent by the first network node, where the handover command is used to instruct to perform the handover.

Embodiment 12: In the method according to Embodiment 11, the second network node and the third network node are managed by the first network node.

Embodiment 13: In the method according to Embodiment 12, when the handover is from the second network node to the third network node, before the receiving, by the terminal device, a handover command sent by the first network node, the method further includes: establishing, by the terminal device, a first link and a second link, where the first link is from the first network node to the second network node, and the second link is from the first network node to the third network node; determining, by the terminal device, to hand over from the first link to the second link; and transmitting, by the terminal device, data on the second link.

Embodiment 14: In the method according to Embodiment 13, before the terminal device hands over from the first link to the second link, the method further includes: measuring and/or monitoring, by the terminal device, the second link based on a first period.

Embodiment 15: In the method according to Embodiment 14, when the handover is from the second network node to the third network node, before the receiving, by the terminal device, a handover command sent by the first network node, the method further includes: establishing, by the terminal device, a first link, where the first link is from the first network node to the second network node; if a radio link failure occurs on the first link, continuing, by the terminal device, to measure and/or monitor the first link; and when the first link recovers, transmitting, by the terminal device, data on the first link.

Embodiment 16: In the method according to any one of Embodiments 13 to 15, after the receiving, by the terminal device, a handover command sent by the first network node, the method further includes: sending, by the terminal device, a random access request to the first network node and the third network node; receiving, by the terminal device, random access responses sent by the first network node and the third network node; and sending, by the terminal device, a radio resource control setup complete message to the first network node and the third network node.

Embodiment 17: In the method according to Embodiment 11, the second network node is managed by the first network node, the third network node is managed by a fourth network node, and the fourth network node includes at least one of a Packet Data Convergence Protocol layer function, a Service Data Adaptation Protocol layer function, and a radio resource control function.

Embodiment 18: In the method according to Embodiment 17, when the handover is from the second network node to the third network node, the method further includes: sending, by the terminal device, a random access request to the third network node and the fourth network node; receiving, by the terminal device, random access responses sent by the third network node and the fourth network node; and sending, by the terminal device, a radio resource control setup complete message to the third network node and the fourth network node.

Embodiment 19: A terminal device includes: a memory, configured to store an instruction; and a processor, configured to invoke the instruction in the memory, to perform operations of the method according to any one of Embodiments 11 to 18.

Embodiment 20: A handover method includes: receiving, by a second network node, a handover command sent by a first network node, where the handover command is used to instruct to perform handover of a terminal device, the handover is from the second network node to a third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; when the handover is from the first cell of the second network node to the second cell of the second network node, receiving, by the second network node, radio link change instruction information sent by the first network node, where the radio link change instruction information is used to instruct to switch a serving cell of the terminal device from the first cell to the second cell; and releasing, by the second network node, context information of the terminal device based on the handover command.

Embodiment 21: In the method according to Embodiment 20, the second network node and the third network node are managed by the first network node.

Embodiment 22: In the method according to Embodiment 20, the second network node is managed by the first network node, the third network node is managed by a fourth network node, and the fourth network node includes a Packet Data Convergence Protocol layer function and a radio resource control function.

Embodiment 23: In the method according to Embodiment 21 or 22, when the handover is from the second network node to the third network node, the method further includes: sending, by the second network node, a data sending status to the first network node, where the data sending status is used to indicate a sequence number of data that is unsuccessfully sent to the terminal device; or when the handover is from the first cell of the second network node to the second cell of the second network node, the method further includes: receiving, by the second network node, cell change instruction information sent by the first network node, where the cell change instruction message is used to instruct to switch a serving cell of the terminal device from the first cell to the second cell.

Embodiment 24: A network device includes: a memory, configured to store an instruction; and a processor, configured to invoke the instruction in the memory, to perform operations of the method according to any one of Embodiments 20 to 23.

Embodiment 25: A handover method includes: receiving, by a third network node, a first handover request message sent by a first network node, where the first handover request message is used to instruct to perform handover of a terminal device, the handover is from a second network node to the third network node, or the handover is from a first cell of the second network node to a second cell of the second network node, the first network node includes at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; when the handover is from the second network node to the third network node, receiving, by the third network node, radio link establishment instruction information sent by the first network node, where the radio link establishment instruction information is used to instruct the third network node to establish a radio link for the terminal device; and sending, by the third network node, a first handover request acknowledgment message to the first network node, where the first handover request acknowledgment message is used to acknowledge the handover of the terminal device.

Embodiment 26: In the method according to Embodiment 25, the second network node and the third network node are managed by the first network node.

Embodiment 27: A network device includes: a memory, configured to store an instruction; and a processor, configured to invoke the instruction in the memory, to perform operations of the method according to Embodiment 25 or 26.

Embodiment 28: A handover method includes: receiving, by a fourth network node, a second handover request message sent by a first network node, where the second handover request message is used to instruct to perform handover of a terminal device, the handover is from a second network node to a third network node, the second network node is managed by the first network node, the third network node is managed by the fourth network node, the first network node and the fourth network node each include at least one of a Packet Data Convergence Protocol layer function, a Service Data Adaptation Protocol layer function, and a radio resource control function, and the second network node and the third network node each include at least one of a Radio Link Control layer function, a Media Access Control layer function, and a physical layer function; when the handover is from the second network node to the third network node, receiving, by the fourth network node, a data sending status sent by the first network node, where the data sending status is used to indicate a sequence number of data that is unsuccessfully sent to the terminal device; and sending, by the fourth network node, a second handover request acknowledgment message to the first network node, where the second handover request acknowledgment message is used to acknowledge the handover of the terminal device.

Embodiment 29: In the method according to Embodiment 28, the method further includes: sending, by the fourth network node, the unsuccessfully sent data to the third network node based on the data sending status.

Embodiment 30: A network device includes: a memory, configured to store an instruction; and a processor, configured to invoke the instruction in the memory, to perform operations of the method according to Embodiment 28 or 29.

For the meaning of the term "at least one" used in the foregoing embodiments of this application, the expression "at least one of the following items: A, B, and C" is used as an example, and usually means, unless otherwise described, that the item may be any one of the following: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C, and C; and so on. Three elements A, B, and C are used above as an example to describe options of the items. When the expression "the item includes at least one of the following: A, B, . . . , and X", in other words, when the expression includes more elements, applicable options of the item may be similarly obtained according to the foregoing rule.

Names are given to various types of objects such as various messages/information/devices/network elements/systems/apparatuses/actions/operations/procedures/concepts that may appear in this application. It may be understood that these specific names do not constitute a limitation to the related objects. The given names may change with factors such as scenarios, contexts, or use habits. The understanding of the technical meanings of the technical terms in this application should be determined mainly based on the functions and technical effects embodied/performed by the technical terms in the technical solutions.

In the embodiments of this application, it should be noted that the foregoing method embodiments of the embodiments of this application may be applied to a processor or implemented by a processor. The processor may be an integrated circuit chip and has a signal processing capability. In an implementation process, steps in the foregoing method embodiments can be implemented by using a hardware-integrated logical circuit in the processor, or by using instructions in a form of software. The processor may be a general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logical device, a discrete gate or transistor logic device, or a discrete hardware component. The methods, steps, and logic block diagrams disclosed in the embodiments of this application may be implemented or performed. The general-purpose processor may be a microprocessor or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of example but not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a Direct Rambus Dynamic Random Access Memory (Direct Rambus RAM, DR RAM). It should be noted that the memory of the systems and methods described in this specification includes but is not limited to these and any memory of another proper type.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should be further understood that determining B based on A does not mean that B is determined based only on A; B may be determined based on A and/or other information.

It may be understood that the foregoing embodiments of this application may provide a network device to implement the functions of the first network node, the second network node, the third network node, or the fourth network node. The network device includes: a unit configured to perform each method or action performed by the first network node, the second network node, the third network node, or the fourth network node in any method in the foregoing embodiments. The unit included in the network device may be implemented by software and/or hardware. It may be understood that in any method of the embodiments of this application and the design of the method, each method or operation or step or action that needs to be performed by a network device may be implemented by corresponding software or hardware or unit modules combining software and hardware. These unit modules are used as components of a radio access network device provided in this application.

All or some of the foregoing embodiments may be implemented by software, hardware, firmware, or any combination thereof. When software is used to implement the embodiments, the embodiments may be implemented completely or partially in a form of a computer program product. The computer program product may include one or more computer instructions. When computer program instructions are loaded onto and executed by the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any available medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a Solid State Disk, SSD), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover method, comprising:
   determining, by a first network node, that a terminal device needs a handover from a second network node to a third network node, wherein the second network node serves as a source network node and the third network node serves as a target network node in the handover for the terminal device;
   sending, by the first network node, a user equipment context setup request message to the third network node, wherein the user equipment context setup request message is used to instruct the third network node to establish a radio link for the terminal device;
   sending, by the first network node, a handover command to the terminal device, wherein the handover command is used to instruct the terminal device to perform the handover;
   receiving, by the first network node, a data delivery status sent by the second network node, wherein the data delivery status is used to indicate data that is unsuccessfully sent to the terminal device; and
   sending, by the first network node, the unsuccessfully sent data to the third network node based on the data delivery status; and
   wherein:
   the first network node comprises: a packet data convergence protocol layer function, a service data adaptation protocol layer function, and a radio resource control function;
   the second network node comprises: a radio link control layer function, a media access control layer function, and a physical layer function;
   the third network node comprises: a radio link control layer function, a media access control layer function, and a physical layer function; and
   the first network node manages the second network node and the third network node, and the first network node, the second network node, and the third network node are parts of one single base station.

2. The method according to claim 1, further comprising:
   sending, by the first network node, instruction information to the second network node, wherein the instruction information is used to instruct the second network node to release context information of the terminal device.

3. A handover method, applied for a handover of a terminal device from a second network node to a third network node, wherein the second network node serves as a source network node and the third network node serves as a target network node in the handover for the terminal device, the method comprising:
   sending, by the second network node, a data delivery status to a first network node, wherein the data delivery status is used to indicate data that is unsuccessfully sent to the terminal device and to instruct the first network node to send the unsuccessfully sent data to the third network node based on the data delivery status, wherein:
   the first network node comprises: a packet data convergence protocol layer function, a service data adaptation protocol layer function, and a radio resource control function;
   the second network node comprises: a radio link control layer function, a media access control layer function, and a physical layer function;
   the third network node comprises: a radio link control layer function, a media access control layer function, and a physical layer function, and
   the first network node manages the second network node and the third network node, and the first network node, the second network node, and the third network node are parts of one single base station.

4. The method according to claim 3, further comprising:
   receiving, by the second network node, instruction information from the first network node, wherein the instruction information is used to instruct the second network node to release context information of the terminal device.

5. A handover method, applied for a handover of a terminal device from a second network node to a third network node, wherein the second network node serves as a source network node and the third network node serves as a target network node in the handover for the terminal device, the method comprising:
   receiving, by the third network node, a user equipment context setup request message from a first network node, wherein the user equipment context setup request message is used to instruct the third network node to establish a radio link for the terminal device; and
   receiving, by the third network node, data sent from the first network node, wherein the data is determined by the first network node based on a data delivery status from the second network node, and wherein the data delivery status is used to indicate data that is unsuccessfully sent to the terminal device; and wherein:
   the first network node comprises: a packet data convergence protocol layer function, a service data adaptation protocol layer function, and a radio resource control function;
   the second network node comprises: a radio link control layer function, a media access control layer function, and a physical layer function;
   the third network node comprises: a radio link control layer function, a media access control layer function, and a physical layer function, and
   the first network node manages the second network node and the third network node, and the first network node, the second network node, and the third network node are parts of one single base station.

6. An apparatus applied for a handover from a second network node to a third network node, wherein the second network node serves as a source network node and the third network node serves as a target network node in the handover for a terminal device, the apparatus comprising at least one processor and a memory storing instructions for execution by the at least one processor, wherein, when executed, the instructions cause the apparatus to perform operations comprising:
   determining that a terminal device needs the handover;
   sending a user equipment context setup request message to the third network node, wherein the user equipment context setup request message is used to instruct the third network node to establish a radio link for the terminal device;
   sending a handover command to the terminal device, wherein the handover command is used to instruct the terminal device to perform the handover;
   receiving a data delivery status from the second network node, wherein the data delivery status is used to indicate data that is unsuccessfully sent to the terminal device by the second network node; and sending the unsuccessfully sent data to the third network node based on the data delivery status; and wherein:

the apparatus comprises: a packet data convergence protocol layer function, a service data adaptation protocol layer function, and a radio resource control function;

the second network node comprises: a radio link control layer function, a media access control layer function, and a physical layer function;

the third network node comprises: a radio link control layer function, a media access control layer function, and a physical layer function, and the apparatus manages the second network node and the third network node, and the apparatus, the second network node, and the third network node are parts of one single base station.

7. The apparatus according to claim 6, wherein the operations further comprise:

sending instruction information to the second network node, wherein the instruction information is used to instruct the second network node to release context information of the terminal device.

8. An apparatus applied for a handover of a terminal device from the apparatus to a third network node, wherein the apparatus serves as a source network node and the third network node serves as a target network node in the handover for the terminal device, the apparatus comprising at least one processor and a memory storing instructions for execution by the at least one processor, wherein, when executed, the instructions cause the apparatus to perform operations comprising:

sending a data delivery status to a first network node, wherein the data delivery status is used to indicate data that is unsuccessfully sent to the terminal device and to instruct the first network node to send the unsuccessfully sent data to the third network node based on the data delivery status, and wherein:

the first network node comprises: a packet data convergence protocol layer function, a service data adaptation protocol layer function, and a radio resource control function;

the apparatus comprises: a radio link control layer function, a media access control layer function, and a physical layer function;

the third network node comprises: a radio link control layer function, a media access control layer function, and a physical layer function; and the first network node manages the apparatus and the third network node, and the first network node, the apparatus, and the third network node are parts of one single base station.

9. The apparatus according to claim 8, wherein the operations further comprise:

receiving instruction information from the first network node, wherein the instruction information is used to instruct the apparatus to release context information of the terminal device.

10. An apparatus applied for a handover of a terminal device from a second network node to the apparatus, wherein the second network node serves as a source network node and the apparatus serves as a target network node in the handover for the terminal device, the apparatus comprising at least one processor and a memory storing instructions for execution by the at least one processor, wherein, when executed, the instructions cause the apparatus to perform operations comprising:

receiving a user equipment context setup request message sent from a first network node, wherein the user equipment context setup request message is used to instruct the apparatus to establish a radio link for the terminal device; and receiving data from the first network node, wherein the data is determined by the first network node based on a data delivery status from the second network node, and wherein the data delivery status is used to indicate data that is unsuccessfully sent to the terminal device; and wherein:

the first network node comprises: a packet data convergence protocol layer function, a service data adaptation protocol layer function, and a radio resource control function;

the second network node comprises: a radio link control layer function, a media access control layer function, and a physical layer function;

the apparatus comprises: a radio link control layer function, a media access control layer function, and a physical layer function; and the first network node manages the second network node and the apparatus, and the first network node, the second network node, and the apparatus are parts of one single base station.

11. A communication system for a handover, comprising a first network node, a second network node, and a third network node, wherein the second network node serves as a source network node and the third network node serves as a target network node in the handover for a terminal device, and wherein:

the first network node is configured to:
determine that a terminal device needs the handover from the second network node to the third network node;
send a user equipment context setup request message to the third network node, wherein the user equipment context setup request message is used to instruct the third network node to establish a radio link for the terminal device; and
send a handover command to the terminal device, wherein the handover command is used to instruct the terminal device to perform the handover;

the second network node is configured to send a data delivery status to the first network node, wherein the data delivery status is used to indicate data that is unsuccessfully sent to the terminal device;

the first network node is configured to send the unsuccessfully sent data to the third network node based on the data delivery status, and wherein:

the first network node comprises: a packet data convergence protocol layer function, a service data adaptation protocol layer function, and a radio resource control function;

the second network node comprises: a radio link control layer function, a media access control layer function, and a physical layer function;

the third network node comprises: a radio link control layer function, a media access control layer function, and a physical layer function; and the first network node manages the second network node and the third network node, and the first network node, the second network node, and the third network node are parts of one single base station.

12. The communication system according to claim 11, wherein the first network node is configured to send instruction information to the second network node, and wherein the instruction information is used to instruct the second network node to release context information of the terminal device.

13. The communication system according to claim 11, wherein the communication system is one single base station.

14. A non-transitory computer-readable storage medium comprising instructions which, when executed by one or more processors of a first network node, cause the first network node to perform operations comprising:
   determining that a terminal device needs a handover from a second network node to a third network node, wherein the second network node serves as a source network node and the third network node serves as a target network node in the handover for the terminal device;
   sending a user equipment context setup request message to the third network node, wherein the user equipment context setup request message is used to instruct the third network node to establish a radio link for the terminal device;
   sending a handover command to the terminal device, wherein the handover command is used to instruct the terminal device to perform the handover;
   receiving a data delivery status from the second network node, wherein the data delivery status is used to indicate data that is unsuccessfully sent to the terminal device; and
   sending the unsuccessfully sent data to the third network node based on the data delivery status; and wherein:
   the first network node comprises: a packet data convergence protocol layer function, a service data adaptation protocol layer function, and a radio resource control function;
   the second network node comprises: a radio link control layer function, a media access control layer function, and a physical layer function;
   the third network node comprises: a radio link control layer function, a media access control layer function, and a physical layer function; and
   the first network node manages the second network node and the third network node, the first network node, the second network node, and the third network node are parts of one single base station.

* * * * *

UNITED STATES PATENT AND TRADEMARK OFFICE
CERTIFICATE OF CORRECTION

| | |
|---|---|
| PATENT NO. | : 11,265,769 B2 |
| APPLICATION NO. | : 16/673497 |
| DATED | : March 1, 2022 |
| INVENTOR(S) | : Man Wang and Mingzeng Dai |

It is certified that error appears in the above-identified patent and that said Letters Patent is hereby corrected as shown below:

In the Specification

Column 1/Line 10 (Approx.) – Delete "2017, The" and insert -- 2017. The --.

In the Claims

Column 42/Line 3 – In Claim 3, delete "function, and" and insert -- function; and --.

Column 42/Line 41 – In Claim 5, delete "function, and" and insert -- function; and --.

Column 43/Line 11 – In Claim 6, delete "function, and" and insert -- function; and --.

Signed and Sealed this
Seventh Day of June, 2022

Katherine Kelly Vidal
*Director of the United States Patent and Trademark Office*